United States Patent
Na et al.

(10) Patent No.: US 11,475,540 B2
(45) Date of Patent: Oct. 18, 2022

(54) ELECTRONIC DEVICE, CONTROL METHOD THEREOF, AND SYSTEM

(71) Applicant: SAMSUNG ELECTRONICS CO., LTD., Suwon-si (KR)

(72) Inventors: Sangkwon Na, Suwon-si (KR); Wooseok Kang, Suwon-si (KR); Minho Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 63 days.

(21) Appl. No.: 16/830,943

(22) Filed: Mar. 26, 2020

(65) Prior Publication Data

US 2021/0166344 A1    Jun. 3, 2021

(30) Foreign Application Priority Data

Nov. 29, 2019 (KR) .................. 10-2019-0157745

(51) Int. Cl.
*G06T 3/40* (2006.01)
*G06N 3/04* (2006.01)
*G06N 3/08* (2006.01)
*G06T 9/00* (2006.01)

(52) U.S. Cl.
CPC ............ *G06T 3/4046* (2013.01); *G06N 3/04* (2013.01); *G06N 3/08* (2013.01); *G06T 9/002* (2013.01)

(58) Field of Classification Search
CPC .............. G06T 3/4046; G06T 9/002; G06T 2207/20081; G06N 3/04; G06N 3/08; H04N 19/59
See application file for complete search history.

(56) References Cited

U.S. PATENT DOCUMENTS

| 8,306,355 | B2 | 11/2012 | Su et al. |
| 9,936,208 | B1* | 4/2018 | Brailovskiy ........... H04N 19/14 |
| 10,009,622 | B1* | 6/2018 | Mukherjee ............. H04N 19/52 |
| 10,528,841 | B2 | 1/2020 | Wang et al. |

(Continued)

FOREIGN PATENT DOCUMENTS

| CN | 109801214 | 5/2019 |
| EP | 3 567 857 | 11/2019 |

(Continued)

OTHER PUBLICATIONS

Search Report and Written Opinion dated Feb. 15, 2021 in counterpart International Application No. PCT/KR2020/014351.

(Continued)

*Primary Examiner* — Charles T Shedrick
(74) *Attorney, Agent, or Firm* — Nixon & Vanderhye, P.C.

(57) ABSTRACT

An electronic device is provided. The electronic device includes: a memory configured to include at least one instruction; and a processor configured to be connected to the memory to control the electronic device, and obtain an output image by upscaling an input image using an artificial intelligence model trained to upscale an image, wherein the processor is configured to control the electronic device to: obtain parameter information of the artificial intelligence model based on pre-processing related information performed on the input image, and upscale the input image using the artificial intelligence model corresponding to the obtained parameter information.

9 Claims, 20 Drawing Sheets

(56) References Cited

U.S. PATENT DOCUMENTS

| | | |
|---|---|---|
| 10,559,101 B2 | 2/2020 | Lee et al. |
| 2011/0268185 A1 | 11/2011 | Watanabe et al. |
| 2012/0033040 A1 | 2/2012 | Pahalawatta et al. |
| 2013/0028538 A1 | 1/2013 | Simske et al. |
| 2014/0177706 A1 | 6/2014 | Fernandes et al. |
| 2016/0044328 A1 | 2/2016 | Lim et al. |
| 2018/0253618 A1 | 9/2018 | Wang et al. |
| 2018/0293706 A1 | 10/2018 | Viswanathan et al. |
| 2019/0075301 A1 | 3/2019 | Chou et al. |
| 2019/0089987 A1 | 3/2019 | Won et al. |
| 2019/0139276 A1 | 5/2019 | Lee et al. |
| 2020/0053408 A1 | 2/2020 | Park et al. |
| 2020/0145692 A1 | 5/2020 | Xu et al. |
| 2021/0073944 A1 | 3/2021 | Liu et al. |

FOREIGN PATENT DOCUMENTS

| | | |
|---|---|---|
| KR | 10-2019-0051384 | 5/2019 |
| KR | 10-2022648 | 9/2019 |
| KR | 10-2019-0110965 | 10/2019 |
| KR | 10-2173610 | 11/2020 |
| WO | 2017/091900 | 6/2017 |
| WO | 2019/164239 | 8/2019 |

OTHER PUBLICATIONS

Wenzhe Shi et al., "Real-Time Single Image and Video Super-Resolution Using an Efficient Sub-Pixel Convolutional Neural Network," 2016 IEEE Conference on Computer Vision and Pattern Recognition (CVPR), Jun. 30, 2016, pp. 1874-1883.

Partial European Search Report and Written Opinion dated Aug. 7, 2020 in corresponding European Patent Application No. 20166652.6.

Extended Search Report dated Nov. 23, 2020 in counterpart European Patent Application No. 20166652.6.

\* cited by examiner

| IMAGE RELATED INFORMATION | DNN SETTING INFORMATION |
|---|---|
| SD, 10Mbps, AV1 | A DNN SETTING INFORMATION |
| HD, 15Mbps, H.264 | B DNN SETTING INFORMATION |
| Full HD, 20Mbps, HEVC | C DNN SETTING INFORMATION |
| Full HD, 15Mbps, HEVC | D DNN SETTING INFORMATION |

ELECTRONIC DEVICE, CONTROL METHOD THEREOF, AND SYSTEM

CROSS-REFERENCE TO RELATED APPLICATION

This application is based on and claims priority under 35 U.S.C. § 119 to Korean Patent Application No. 10-2019-0157745, filed on Nov. 29, 2019, in the Korean Intellectual Property Office, the disclosure of which is incorporated by reference herein in its entirety.

BACKGROUND

Field

The disclosure relates to an electronic device, a control method thereof, and a system, and for example, to an electronic device, a control method thereof, a system that perform up-scaling.

Description of Related Art

In accordance with the development of electronic technology, various types of electronic devices have been developed and distributed. In particular, display devices, such as mobile devices and TVs, which are most commonly used in recent years, are rapidly developing in recent years.

In particular, as the content provided to the user becomes super high resolution, the amount of computation and data of the electronic device increases exponentially. Accordingly, the amount of data transmitted to the electronic device is reduced through downscaling, pre-processing, and encoding.

In this case, although the amount of computation and data of the electronic device is reduced, there was a problem that an original image is provided to a user in a state in which the detail included in the original image is lost. In particular, in a live streaming situation, there was a problem that a restored image is provided to the user in a state in which the detail lost during the pre-processing of the original image is not restored.

SUMMARY

Embodiments of the disclosure address the above disadvantages and other disadvantages not described above.

Embodiments of the disclosure provide an electronic device, a system, and a control method thereof that perform pre-processing by interlocking artificial intelligent (AI) encoding and decoding with each other and considering characteristic information of an image to improve compression and encoding performance.

According to an example embodiment of the disclosure, an electronic device includes: a memory configured to include at least one instruction; and a processor configured to be connected to the memory to control the electronic device, and obtain an output image by upscaling an input image using an artificial intelligence model trained to upscale an image, wherein the processor is configured to control the electronic device to: obtain parameter information of the artificial intelligence model based on pre-processing related information performed on the input image, and upscale the input image using the artificial intelligence model corresponding to the obtained parameter information.

The memory may store parameter information mapped to the pre-processing related information corresponding to each of different pre-processings, and the processor may be configured to identify parameter information corresponding to the pre-processing related information received together with the input image among the stored parameter information, and upscale the input image using the artificial intelligence model corresponding to the identified parameter information.

The parameter information stored in the memory may include filter related information applied to each of the different pre-processings, and the processor may be configured to identify parameter information corresponding to the filter related information received together with the input image among the stored parameter information, and upscale the input image using the artificial intelligence model corresponding to the identified parameter information.

The filter related information applied to each of the different pre-processings may include information on at least one of a type or intensity of a filter applied to each of the different pre-processings.

The filter related information applied to each of the different pre-processings may further include information on a difference between an image before the filter is applied and an image after the filter is applied.

The processor may be configured to decode the input image, and upscale the decoded image using the artificial intelligence model.

The artificial intelligence model may include a plurality of neural network layers, and the processor may be configured to set a parameter corresponding to each of the plurality of neural network layers based on the obtained parameter information.

According to another example embodiment of the disclosure, a system includes: a transmitting device including circuitry configured to downscale an input image using a first artificial intelligence model trained to downscale an image, and pre-process the downscaled image to transmit the pre-processed image; and a receiving device including circuitry configured to upscale the image received from the transmitting device using a second artificial intelligence model trained to upscale the image to obtain an output image, wherein the transmitting device is configured to pre-process the downscaled image based on characteristic information of the image obtained from the first artificial intelligence model, and transmit pre-processing related information to the receiving device, and the receiving device is configured to: obtain parameter information of the second artificial intelligence model based on the pre-processing related information received from the transmitting device, and upscale the image received from the transmitting device using the second artificial intelligence model corresponding to the obtained parameter information.

The transmitting device may be configured to further include a communication interface comprising communication circuitry, and obtain status information of a network to which the communication interface is connected, and pre-process the downscaled image based on the status information of the network and the characteristic information of the image obtained from the first artificial intelligence model.

The pre-processing related information may include information on at least one of a type or intensity of a filter applied to pre-processing of the downscaled image.

The pre-processing related information may further include information on a difference between an image before the filter is applied and an image after the filter is applied.

The transmitting device may be configured to encode the pre-processed image and transmit the encoded image to the receiving device, and the receiving device may be configured to obtain an output image by decoding the encoded image received from the transmitting device and upscaling the decoded image using the second artificial intelligence model.

The transmitting device may further include a third artificial intelligence model trained to obtain the pre-processing related information of the image using the characteristic information of the image obtained from the first artificial intelligence model, and the processor may be configured to obtain the pre-processing related information of the downscaled image using the third artificial intelligence model.

According to another example embodiment of the disclosure, a method of controlling an electronic device includes: obtaining parameter information of an artificial intelligence model trained to upscale an image based on pre-processing related information performed on an input image; and obtaining an output image by upscaling the input image using the artificial intelligence model corresponding to the obtained parameter information.

The obtaining of the parameter information may include identifying parameter information corresponding to the pre-processing related information received together with the input image in a memory storing parameter information mapped to pre-processing related information corresponding to each of different pre-processings, and the obtaining of the output image may include upscaling the input image using the artificial intelligence model corresponding to the identified parameter information.

The parameter information stored in the memory may include filter related information applied to each of the different pre-processings, the obtaining of the parameter information may include identifying parameter information corresponding to the filter related information received together with the input image among the stored parameter information, and the obtaining of the output image may include upscaling the input image using the artificial intelligence model corresponding to the identified parameter information.

The filter related information applied to each of the different pre-processings may include information on at least one of a type or intensity of a filter applied to each of the different pre-processings.

The filter related information applied to each of the different pre-processings may include information on a difference between an image before the filter is applied and an image after the filter is applied.

The obtaining of the output image may include decoding the input image and upscaling the decoded image using the artificial intelligence model.

The artificial intelligence model may include a plurality of neural network layers, and the method may further include setting a parameter corresponding to each of the plurality of neural network layers based on the obtained parameter information.

As described above, according to various example embodiments of the disclosure, the upscaled image may include detail lost in the pre-processing process.

Further, it may be possible to restore detail included in the original image while reducing the amount of data and computation.

Further, even in the real-time streaming environment, the pre-processing appropriate to the network conditions may be performed by adaptively using the pre-processing filter.

Further, detail lost based on the pre-processing may be easily restored while improving encoding performance.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 13 is an diagram illustrating an example mapping relationship between a plurality of pieces of image related information and a plurality of pieces of DNN setting information according to an embodiment of the disclosure;

DETAILED DESCRIPTION

Figure 1:
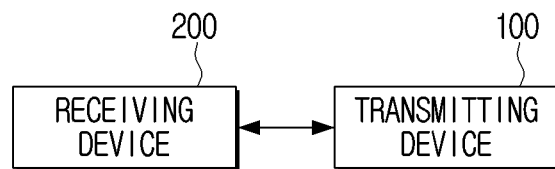
FIG. 1 is a block diagram illustrating an example configuration of a system according to an embodiment of the disclosure.

Hereinafter, the disclosure will be described in greater detail with reference to the accompanying drawings.

General terms that are currently widely used were selected as terms used in embodiments of the disclosure in consideration of functions in the disclosure, but may be changed depending on the intention of those skilled in the art or a judicial precedent, an emergence of a new technique, and the like. In addition, in a specific case, terms may be arbitrarily. In this case, the meaning of such terms may be mentioned in a corresponding description portion of the disclosure. Therefore, the terms used in the disclosure should be defined based on the meaning of the terms and the contents throughout the disclosure rather than simple names of the terms.

In the disclosure, an expression "have", "may have", "include", "may include", or the like, indicates an existence of a corresponding feature (for example, a numerical value, a function, an operation, a component such as a part, or the like), and does not exclude an existence of an additional feature.

The expression "at least one of A and/or B" should be understood to represent either "A" or "B" or any one of "A and B".

Expressions "first", "second", and the like, used in the disclosure may indicate various components regardless of a sequence and/or importance of the components, may be used to distinguish one component from the other components, and do not limit the corresponding components.

When it is mentioned that any component (for example, a first component) is (operatively or communicatively) coupled with/to or is connected to another component (for example, a second component), it is to be understood that any component is directly coupled with/to another component or may be coupled with/to another component through the other component (for example, a third component).

Singular expressions include plural expressions unless the context clearly indicates otherwise. It should be further understood that the term "include" or "constituted" used in the application specify the presence of features, numerals, steps, operations, components, parts mentioned in the specification, or combinations thereof, but do not preclude the presence or addition of one or more other features, numerals, steps, operations, components, parts, or combinations thereof.

In the disclosure, a 'module' or a '~er/~or' may perform at least one function or operation, and be implemented by hardware or software or be implemented by a combination of hardware and software. In addition, a plurality of 'modules' or a plurality of '~ers/ors' may be integrated in at least one module and be implemented as at least one processor (not illustrated) except for a 'module' or an '~er/or' that needs to be implemented by specific hardware.

In addition, in the disclosure, an 'image' or a 'picture' may refer, for example, to a still image, a moving image including a plurality of consecutive still images (or frames), a video, or the like, but is not limited thereto.

In addition, in the disclosure, a 'deep neural network (DNN)' may refer, for example, to a representative example of an artificial neural network model that simulates brain nerves, and is not limited to the artificial neural network model using a specific algorithm.

In addition, in the disclosure, a 'parameter' may refer, for example, to a value used in a calculation process of each layer of the neural network, and may include, for example, a weight used when applying an input value to a predetermined calculation expression. In addition, the parameter may be represented in the form of a matrix. The parameter may refer, for example, to a value set as a result of training and may be updated through separate training data as necessary.

In addition, in the disclosure, a 'first DNN' may refer, for example, to to a DNN used for AI downscaling of an image, and a 'second DNN' may refer, for example, to a DNN used for AI upscaling of an image.

In addition, in the disclosure, 'DNN setting information' may refer, for example, to information related to elements of the DNN and includes the above-described parameter. The first DNN or the second DNN may be set using the DNN setting information.

In addition, in the disclosure, a first artificial intelligence model may refer, for example, to an artificial intelligence model used for upscaling of an image, and a second artificial intelligence model may refer, for example, to an artificial intelligence model used for downscaling of an image.

In addition, in the disclosure, an 'original image' may refer, for example, to an image which is a target of AI encoding or an image received by a transmitting device, and a 'first image' or a 'downscaled image' may refer, for example, to an image obtained as a result of AI downscaling of the original image in the AI encoding process. In addition, a 'second image' or a 'decoded image' may refer, for example, to an image obtained by first decoding in an AI decoding process, and a 'third image' or an 'upscaled image' may refer, for example, to an image obtained by AI upscaling the second image in the AI decoding process.

In addition, in the disclosure, 'AI downscaling' or 'downscaling' may refer, for example, to processing of reducing a resolution of an image based on AI, and 'first encoding' may refer, for example, to encoding processing by a frequency transformation based image compression method. In addition, 'first decoding' may refer, for example, to decoding processing by a frequency transformation based image restoration method, and 'AI upscaling' or 'upscaling' may refer, for example, to processing of increasing a resolution of an image based on AI.

In the disclosure, a term "user" may be a person that uses the electronic device or a device (e.g., an artificial intelligence electronic device) that uses the electronic device.

Hereinafter, embodiments of the disclosure will be described in greater detail with reference to the accompanying drawings.

FIG. 1 is a block diagram illustrating an example configuration of an example system according to an embodiment of the disclosure.

As illustrated in FIG. 1, a system 300 according to an embodiment of the disclosure includes a receiving device 100 and a transmitting device 200.

The system 300 according to an embodiment may, for example, include an image streaming system and may be implemented by the transmitting device that transmits a real-time image and the receiving device 100 that receives and displays the image. This is an example and the system 300 is not limited thereto.

The transmitting device 200 according to an embodiment of the disclosure may be implemented as a server and may transmit the image to a plurality of electronic devices.

The transmitting device 200 according to various embodiments of the disclosure may include at least one of, for example, and without limitation, a smartphone, a tablet personal computer (PC), a mobile phone, an image phone, an e-book reader, a desktop PC, a laptop PC, a netbook computer, a workstation, a server, a personal digital assistant (PDA), a portable multimedia player (PMP), an MP3 player, a medical device, a camera, a virtual reality (VR) implementing device, a wearable device, or the like. The wearable device may include, for example, and without limitation, at least one of an accessory type wearable device (for example, a watch, a ring, a bracelet, an anklet, a necklace, a glasses, a contact lens, a head-mounted-device (HMD)), a textile or clothing integral type wearable device (for example, an electronic clothing), a body attachment type wearable device (for example, a skin pad or a tattoo), a bio-implantable circuit, or the like. In some embodiments, the electronic device may include at least one of, for example, and without limitation, a television, a digital video disk (DVD) player, an audio player, a refrigerator, an air conditioner, a cleaner, an oven, a microwave oven, a washing machine, an air cleaner, a set-top box, a home automation control panel, a security control panel, a media box (for example, HomeSync™ of Samsung Electronics Co., Ltd, AppleTV™ of Apple Inc, or GoogleTV™ of Google), a game console (for example Xbox™, PlayStation™), an electronic dictionary, an electronic key, a camcorder, an electronic frame, or the like.

In another embodiment, the electronic device may include, for example, and without limitation, at least one of various medical devices (for example, various portable medical measuring devices (such as a blood glucose meter, a heart rate meter, a blood pressure meter, a body temperature meter, or the like), a magnetic resonance angiography (MRA), a magnetic resonance imaging (MRI), a computed tomography (CT), a photographing device, an ultrasonic device, or the like), a navigation device, a global navigation satellite system (GNSS), an event data recorder (EDR), a flight data recorder (FDR), an automobile infotainment device, a marine electronic equipment (for example, a marine navigation device, a gyro compass, or the like), avionics, a security device, an automobile head unit, an industrial or household robot, a drone, an automatic teller's machine (ATM) of a financial institute, a point of sales (POS) of a shop, Internet of things (IoT) devices (for example, a light bulb, various sensors, a sprinkler system, a fire alarm, a thermostat, a street light, a toaster, an exercise equipment, a hot water tank, a heater, a boiler, and the like), or the like.

The receiving device 100 according to an embodiment of the disclosure may display the image. The receiving device 100 may be implemented, for example, as a television (TV), but is not limited thereto and may be applied without limitation as long as it has a display function, such as, for example, and without limitation, a video wall, a large format display (LFD), a digital signage, a digital information display (DID), a projector display, or the like. In addition, the receiving device 100 may be implemented in various forms of displays such as, for example, and without limitation, a liquid crystal display (LCD), an organic light-emitting diode (OLED), liquid crystal on silicon (LCoS), a digital light processing (DLP), a quantum dot (QD) display panel, quantum dot light-emitting diodes (QLED), micro light-emitting diodes (μLED), a mini LED, and the like. The receiving device 100 may be implemented, for example, and without limitation, as a touch screen combined with a touch sensor, a flexible display, a rollable display, a three-dimensional (3D) display, a display in which a plurality of display modules are physically connected to each other, and the like.

The receiving device 100 according to an embodiment of the disclosure may process and display the image received from the transmitting device 200.

As another example, the receiving device 100 may also be implemented as various types of electronic devices that do not have the display function.

The receiving device 100 according to various embodiments of the disclosure may include at least one of, for example, and without limitation, a smartphone, a tablet personal computer (PC), a mobile phone, an image phone, an e-book reader, a desktop PC, a laptop PC, a netbook computer, a workstation, a server, a personal digital assistant (PDA), a portable multimedia player (PMP), an MP3 player, a medical device, a camera, a virtual reality (VR) implementing device, a wearable device, or the like. The wearable device may include, for example, and without limitation, at least one of an accessory type wearable device (for example, a watch, a ring, a bracelet, an anklet, a necklace, a glasses, a contact lens, or a head-mounted-device (HMD)), a textile or clothing integral type wearable device (for example, an electronic clothing), a body attachment type wearable device (for example, a skin pad or a tattoo), a bio-implantable circuit, or the like. In some embodiments, the electronic device may include at least one of, for example, and without limitation, a television, a digital video disk (DVD) player, an audio player, a refrigerator, an air conditioner, a cleaner, an oven, a microwave oven, a washing machine, an air cleaner, a set-top box, a home automation control panel, a security control panel, a media box (for example, HomeSync™ of Samsung Electronics Co., Ltd, AppleTV™ of Apple Inc, or GoogleTV™ of Google), a game console (for example Xbox™, PlayStation™), an electronic dictionary, an electronic key, a camcorder, an electronic frame, or the like.

In another embodiment, the electronic device may include, for example, and without limitation, at least one of various medical devices (for example, various portable medical measuring devices (such as a blood glucose meter, a heart rate meter, a blood pressure meter, a body temperature meter, or the like), a magnetic resonance angiography (MRA), a magnetic resonance imaging (MRI), a computed tomography (CT), a photographing device, an ultrasonic device, or the like), a navigation device, a global navigation satellite system (GNSS), an event data recorder (EDR), a flight data recorder (FDR), an automobile infotainment device, a marine electronic equipment (for example, a marine navigation device, a gyro compass, or the like), avionics, a security device, an automobile head unit, an industrial or household robot, a drone, an automatic teller's machine (ATM) of a financial institute, a point of sales (POS) of a shop, Internet of things (IoT) devices (for example, a light bulb, various sensors, a sprinkler system, a fire alarm, a thermostat, a street light, a toaster, an exercise equipment, a hot water tank, a heater, a boiler, and the like), or the like.

For example, the receiving device 100 may also be implemented as a set-top box to receive an image from an external electronic device, process the received image, and transmit the processed image to an external display device having a display function. The receiving device 100 may be a system itself in which a cloud computing environment is established. The receiving device 100 is not limited thereto, and any device that processes data using an artificial intelligence model may be applied without limitation.

Figure 2:
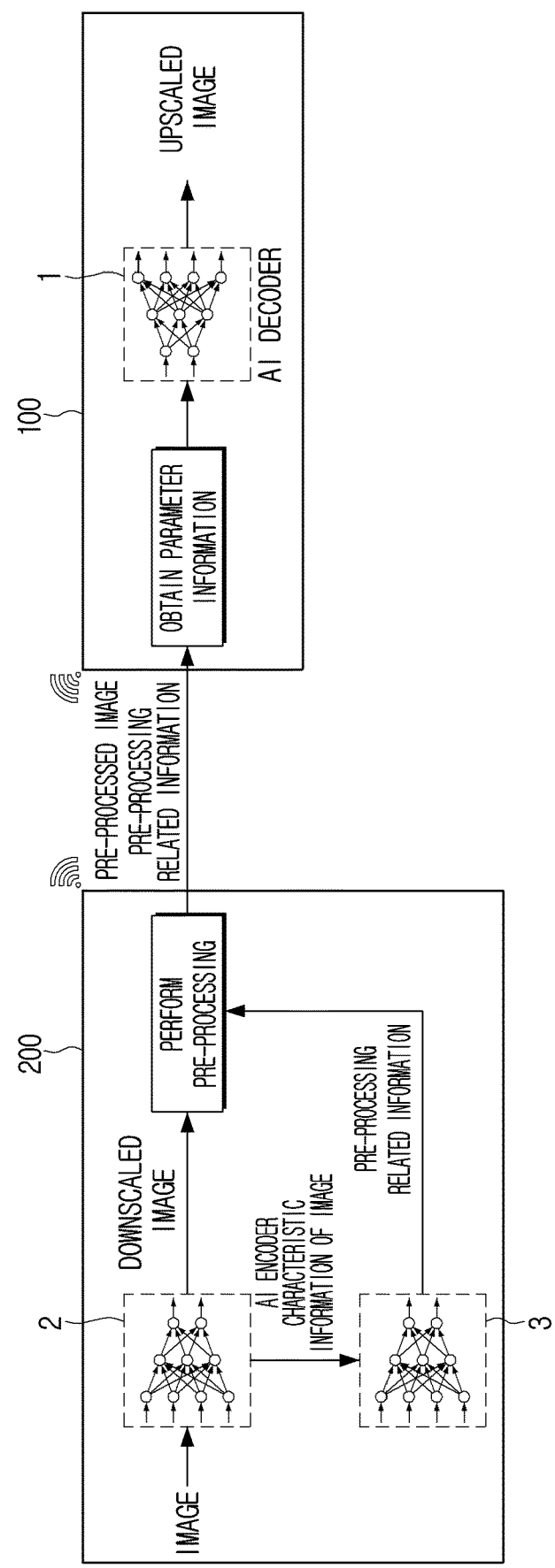
FIG. 2 is a diagram illustrating an example operation of the system according to an embodiment of the disclosure.

FIG. 2 is a diagram illustrating an example operation of the system according to an embodiment of the disclosure.

Referring to FIG. 2, the transmitting device 200 may pre-process the image and transmit the pre-processed image to the receiving device 100.

As an example, the transmitting device 200 may encode the image and transmit the encoded image to the receiving device 100. The transmitting device 200 may obtain an encoded image by performing pre-processing on the image and encoding the pre-processed image to improve compression and encoding performance on the image. The transmitting device 200 may transmit the encoded image to the receiving device 100.

For example, in order to remove random noise, which occupies a large portion of the factors that reduce the compression and encoding performance, the transmitting device 200 may perform a pre-processing process of applying, for example, a bilateral filter, to the image. The transmitting device 200 may encode the pre-processed image, for example, an image in which an edge component is maintained and a noise component is removed according to the application of the bilateral filter, and transmit the encoded image to the receiving device 100.

Conventionally, there is an advantage that an encoding efficiency on the image (e.g., the image to which the bilateral filter is applied) pre-processed in the encoding process of the transmitting device 200 is high, but there was a problem that texture, detail, and the like of the image removed in the pre-processing process are not restored in a decoding process of the receiving device 100. Hereinafter, various embodiments in which the receiving device 100 performs decoding so that the restored image obtained by the receiving device 100 includes texture, detail, and the like of the original image will be described.

Referring to FIG. 2, the transmitting device 200 may transmit an encoded image to the receiving device 100.

As a resolution of an image increases rapidly, the throughput of information for encoding/decoding increases, and accordingly, a method for improving an encoding and decoding efficiency of the image has been required.

The transmitting device 200 according to an embodiment of the disclosure may downscale a high-resolution image (e.g., an original image) using a second artificial intelligence model 2 trained to downscale the image. The high-resolution image may refer to an ultra-high definition (UHD) image (e.g., an 8K (8192*4320) UHD image). For example, the transmitting device 200 may downscale resolution of an input image from 8K resolution to 4K resolution using the second artificial intelligence model 2. The transmitting device 200 obtains a low resolution image by downscaling the resolution of the input image, and encodes the low resolution downscaled image, and as a result, the amount of computation and the throughput may be greatly reduced compared to a case of performing encoding on a high resolution input image.

The second artificial intelligence model 2 learned (e.g., trained) to downscale the image may be referred to as an AI encoder, an AI downscaler, or the like, but hereinafter, the second artificial intelligence model 2 will be collectively referred to for convenience of description.

The transmitting device 200 according to an embodiment may pre-process the downscaled image and transmit the pre-processed image to the receiving device 100. The transmitting device 200 may pre-process the downscaled image based on characteristic information of the image obtained from the second artificial intelligence model 2 and transmit pre-processing related information to the receiving device 100.

As an example, the transmitting device 200 may obtain the pre-processing related information based on the characteristic information of the image obtained from the second artificial intelligence model 2 and pre-process the downscaled image based on the obtained pre-processing related information.

For example, the pre-processing related information may include information on at least one of a type or intensity of a filter. The transmitting device 100 according to an embodiment may filter the downscaled image based on the information on the type or intensity of the filter included in the pre-processing related information. A description thereof will be described in greater detail below with reference to FIGS. 7 and 8.

The transmitting device 200 according to an embodiment of the disclosure may encode the pre-processed image. An encoding process may include, for example, and without limitation, a process of predicting the pre-processed image to generate prediction data, a process of generating residual data corresponding to a difference between the pre-processed image and the prediction data, a process of transforming the residual data, which may refer, for example, to a space domain component, into a frequency domain component, a process of quantizing the residual data transformed into the frequency domain component, a process of entropy-encoding the quantized residual data, or the like. Such an encoding process may be implemented through at least one of, for example, and without limitation, image compression methods using frequency transformation, such as, for example, and without limitation, MPEG-2, H.264 Advanced Video Coding (AVC), MPEG-4, High Efficiency Video Coding (HEVC), VC-1, VP8, VP9, AOMedia Video 1 (AV1), and the like.

The transmitting device 200 may transmit the encoded image and the pre-processing related information to the receiving device 100. For example, the transmitting device 200 may transmit image data including the encoded image and the pre-processing related information to the receiving device 100 in the form of a bit stream.

The image data may also include quantization parameter (QP) related information used in the encoding process of the transmitting device 200. The image data according to an embodiment may be generated according to a rule of the image compression method used in the encoding process among the image compression methods using the frequency transformation such as, for example, and without limitation, MPEG-2, H.264 AVC, MPEG-4, HEVC, VC-1, VP8, VP9, and AV1, for example, syntax. According to an embodiment, the pre-processing related information may be referred to as meta data, meta information, or the like, but hereinafter, the pre-processing related information will be collectively referred to for convenience of description.

The receiving device 100 according to an embodiment of the disclosure may receive an image having various resolutions and various compressed images. For example, the receiving device 100 may receive at least one of, for example, and without limitation, a standard definition (SD), a high definition (HD), an FHD, a UHD image, an image having resolution of a UHD or more, or the like. In addition, the receiving device 100 may receive an image in a compressed form in, for example, and without limitation, a moving picture experts group (MPEG) (e.g., MP2, MP4, MP7, etc.), a joint photographic coding experts group (JPEG), Advanced Video Coding (AVC), H.264, H.265, High Efficiency Video Codec (HEVC), VC-1, VP8, VP9, AOMedia Video 1 (AV1), or the like.

The receiving device 100 may upscale the image received from the transmitting device 200 using the first artificial intelligence model 1 learned (e.g., trained) to upscale the image and obtain an output image. As an example, the receiving device 100 may upscale the image downscaled by the transmitting device 200 to obtain a high-resolution image.

The first artificial intelligence model 1 learned (e.g., trained) to upscale the image may be referred to, for example, as an AI decoder, an AI upscaler, or the like, but hereinafter, the first artificial intelligence model 1 will be collectively referred to for convenience of description.

The artificial intelligence model being learned (e.g., trained) may refer, for example, to a basic artificial intelligence model (e.g., an artificial intelligence model including any random parameters) being learned (e.g., trained) using a plurality of training data by a learning algorithm, thereby creating a predefined operation rule or artificial intelligence model set to perform a desired characteristic (or purpose). Such learning may be performed through a separate server and/or system, but is not limited thereto and may also be performed in an electronic device. An example of the learning algorithm includes, without limitation, supervised learning, unsupervised learning, semi-supervised learning, reinforcement learning, or the like, but the learning algorithm is not limited to the examples described above.

Each of the first and second artificial intelligence models 1 and 2 may be implemented as, for example, and without limitation, a convolutional neural network (CNN), a recurrent neural network (RNN), a restricted Boltzmann machine (RBM), a deep belief network (DBN), a bidirectional recurrent deep neural network (BRDNN), deep Q-networks, or the like, but is not limited to the examples described above.

Referring to FIG. 2, the receiving device 100 according to an embodiment of the disclosure may decode the encoded image. According to an embodiment, the receiving device 100 may decode the encoded image to obtain the pre-processed image, for example, a pre-encoding image.

The decoding may include, for example, and without limitation, a process of entropy-decoding image data to generate quantized residual data, a process of dequantizing the quantized residual data, a process of transforming the residual data, which is a frequency domain component, into a space domain component, a process of generating prediction data, a process of restoring the encoded image using the prediction data and the residual data, or the like. Such a decoding process may be implemented through an image restoration method corresponding to one of the image compression methods using the frequency transformation, such as MPEG-2, H.264, MPEG-4, HEVC, VC-1, VP8, VP9, AV1, and the like used in the encoding process.

The receiving device 100 according to an embodiment of the disclosure may obtain parameter information of the first artificial intelligence model 1 based on the pre-processing related information received from the transmitting device 200. The parameter information may refer to a set of parameters for obtaining, setting, or modeling the first artificial intelligence model 1. The parameter may also be referred to as weight, coefficient, or the like.

The receiving device 100 according to an embodiment of the disclosure may upscale the image received from the transmitting device 200 using the first artificial intelligence model 1 corresponding to the parameter information to obtain an output image. The output image may also be referred to as an upscaled image or a restored image corresponding to an input image. The input image may refer to an image first input to the transmitting device 200.

Hereinafter, various embodiments in which the receiving device 100 upscales the image received from the transmitting device 200 using the first artificial intelligence model 1 corresponding to the parameter information will be described in greater detail.

Figure 3:
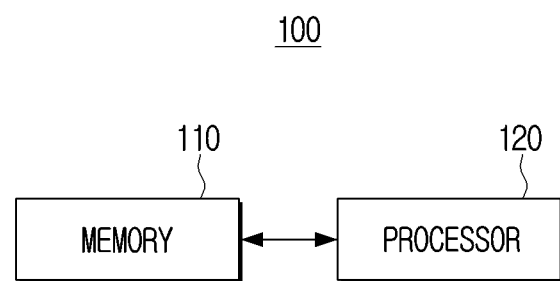
FIG. 3 is a block diagram illustrating an example configuration of a receiving device according to an embodiment of the disclosure.

FIG. 3 is a block diagram illustrating an example configuration of the receiving device according to an embodiment of the disclosure.

Referring to FIG. 3, the receiving device 100 according to an embodiment of the disclosure includes a memory 110 and a processor (e.g., including processing circuitry) 120.

The memory 110 may store data necessary for various embodiments of the disclosure. The memory 110 may be implemented in the form of a memory embedded in the receiving device 100 or may also be implemented in the form of a memory attachable to and detachable from the receiving device 100, depending on a data storage purpose. For example, data for driving the receiving device 100 may be stored in the memory embedded in the receiving device 100, and data for extended function of the receiving device 100 may be stored in the memory attachable to and detachable from the receiving device 100. The memory embedded in the receiving device 100 may be implemented as, for example, and without limitation, at least one of a volatile memory (e.g., a dynamic random access memory (DRAM), a static RAM (SRAM), a synchronous dynamic RAM (SDRAM), or the like), or a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash, a NOR flash, or the like), a hard drive, or a solid state drive (SSD)), or the like. In addition, the memory attachable to and detachable from the receiving device 100 may be implemented in the form such as a memory card (e.g., a compact flash (CF), a secure digital (SD), a micro secure digital (Micro-SD), a mini secure digital (Mini-SD), an extreme digital (xD), a multi-media card (MMC), or the like), an external memory connectable to a USB port (e.g., a USB memory), or the like.

According to an example, the memory 110 may store a computer program including at least one instruction or instructions for controlling the receiving device 100.

According to another example, the memory 110 may store information on an artificial intelligence model including a plurality of layers. The storing of the information on the artificial intelligence model may refer, for example, to storing various information related to an operation of the artificial intelligence model, for example, information on the plurality of layers included in the artificial intelligence model, information on parameters (e.g., filter coefficients, bias, and the like) used in each of the plurality of layers, and the like. For example, the memory 110 may store information on the first artificial intelligence model 1 trained to perform the upscaling processing of the image according to an embodiment of the disclosure. The upscaling processing may include, for example, super resolution processing. However, when the processor 120 is implemented by dedicated hardware, the information on the artificial intelligence model may also be stored in an internal memory of the processor 120.

According to another example, the memory 110 may store an image received from an external device (e.g., a source device), an external storage medium (e.g., USB), an external server (e.g., web hard), or the like. The image may be a digital moving image, but is not limited thereto.

According to another example, the memory 110 may store various information necessary for image quality processing, for example, information for performing at least one of noise reduction, detail enhancement, tone mapping, contrast enhancement, color enhancement, or frame rate conversion, an algorithm, an image quality parameter, and the like. In addition, the memory 110 may also store a final output image generated by the image processing.

According to an embodiment of the disclosure, the memory 110 may be implemented as a single memory that stores data generated in various operations according to the disclosure. However, according to another embodiment of the disclosure, the memory 110 may be implemented to include a plurality of memories that respectively store different types of data or that respectively store data generated at different stages.

In the above-described embodiments, various data are described as being stored in the external memory 110 of the processor 120, but at least some of the above-described data may also be stored in an internal memory of the processor 120 according to an implementation example of at least one of the receiving device 100 or the processor 120.

The processor 120 may include various processing circuitry and is electrically connected to the memory 110 to control an overall operation of the receiving device 100. The processor 120 may be configured as one or a plurality of processors. For example, the processor 120 may perform an operation of the receiving device 100 according to various embodiments of the disclosure by executing at least one instruction stored in the memory 110.

According to an embodiment, the processor 120 may be implemented, for example, and without limitation, as a digital signal processor (DSP) for processing a digital image signal, a microprocessor, a graphics processing unit (GPU), an artificial intelligence (AI) processor, a neural processing unit (NPU), a time controller (TCON), or the like. However, the processor 120 is not limited thereto, but may include, for example, and without limitation, one or more of a central processing unit (CPU), a dedicated processor, a micro controller unit (MCU), a micro processing unit (MPU), a controller, an application processor (AP), a communication processor (CP), an ARM processor, or the like, or may be defined as the corresponding term. In addition, the processor 120 may be implemented by a system-on-chip (SoC) or a large scale integration (LSI) in which a processing algorithm is embedded, or may be implemented in the form of an application specific integrated circuit (ASIC) and a field programmable gate array (FPGA).

In addition, the processor 120 for executing the artificial intelligence model according to an embodiment of the disclosure may be implemented through a combination of a general purpose processor such as a CPU, an AP, a digital signal processor (DSP), or the like, a graphics dedicated processor such as a GPU, a vision processing unit (VPU), or an artificial intelligence dedicated processor such as a NPU, and software. The processor 120 may control to process the input data according to the predefined operation rule or artificial intelligence model stored in the memory 110. When the processor 120 is a dedicated processor (or an artificial intelligence dedicated processor), the processor 120 may be designed in a hardware architecture specialized for the processing of a specific artificial intelligence model. For example, hardware specialized for the processing of the specific artificial intelligence model may be designed as a hardware chip such as ASIC and FPGA. When the processor 120 is implemented as the dedicated processor, the processor 120 may be implemented to include a memory for implementing an embodiment of the disclosure, or implemented to include a memory processing function for using an external memory.

The processor 120 processes input data to obtain output data. The input data may include at least one of a text, an image, or a user voice. For example, the input data may be input through a communicator including various communication circuitry capable of communicating with an external device, a user inputter such as a keyboard or a touch pad, a camera, a microphone, or the like. The output data may be in various forms depending on the type of artificial intelligence model. For example, the output data may include, for example, and without limitation, an image having an improved resolution, object related information included in the image, a text corresponding to voice, and the like.

According to an example, the processor 120 may perform image processing on the input image to obtain the output image. The image may include, for example, and without limitation, a still image, a plurality of consecutive still images (or frames), a video, or the like. The image processing may be digital image processing including, for example, and without limitation, at least one of image enhancement, image restoration, image transformation, image analysis, image understanding, image compression, or the like. According to an example, when the input image is a compressed image, the processor 120 may decode the compressed image and then perform the image processing. According to an embodiment, the processor 120 may perform the image processing on the input image using the artificial intelligence model. For example, the processor 120 may load and use artificial intelligence model related information stored in the memory 110, for example, an external memory such as DRAM, in order to use the artificial intelligence model.

Figure 4:
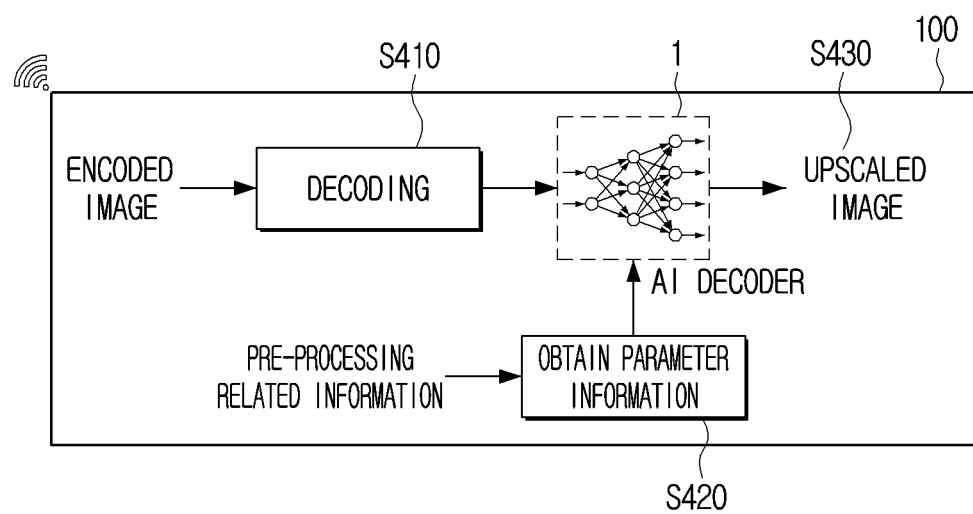
FIG. 4 is a diagram illustrating an example operation of the receiving device according to an embodiment of the disclosure.

FIG. 4 is a diagram illustrating an example operation of the receiving device according to an embodiment of the disclosure.

Referring to FIG. 4, the processor 120 according to an embodiment of the disclosure may decode the input image received from the transmitting device 200 (S410). The input image is illustrated as the encoded image in FIG. 4, but the input image is collectively referred to for convenience of description.

The processor 120 according to an embodiment may obtain parameter information of the first artificial intelligence model 1 based on the pre-processing related information performed on the input image (S420). The processor 120 may upscale the input image using the first artificial intelligence model corresponding to the obtained parameter information (S430).

The memory 110 according to an embodiment of the disclosure may store the parameter information mapped to the pre-processing related information corresponding to each of different pre-processings. The processor 120 according to an embodiment may identify parameter information corresponding to the pre-processing related information received together with the input image among the stored parameter information (S420).

A detailed description thereof will be described with reference to FIG. 5.

Figure 5:
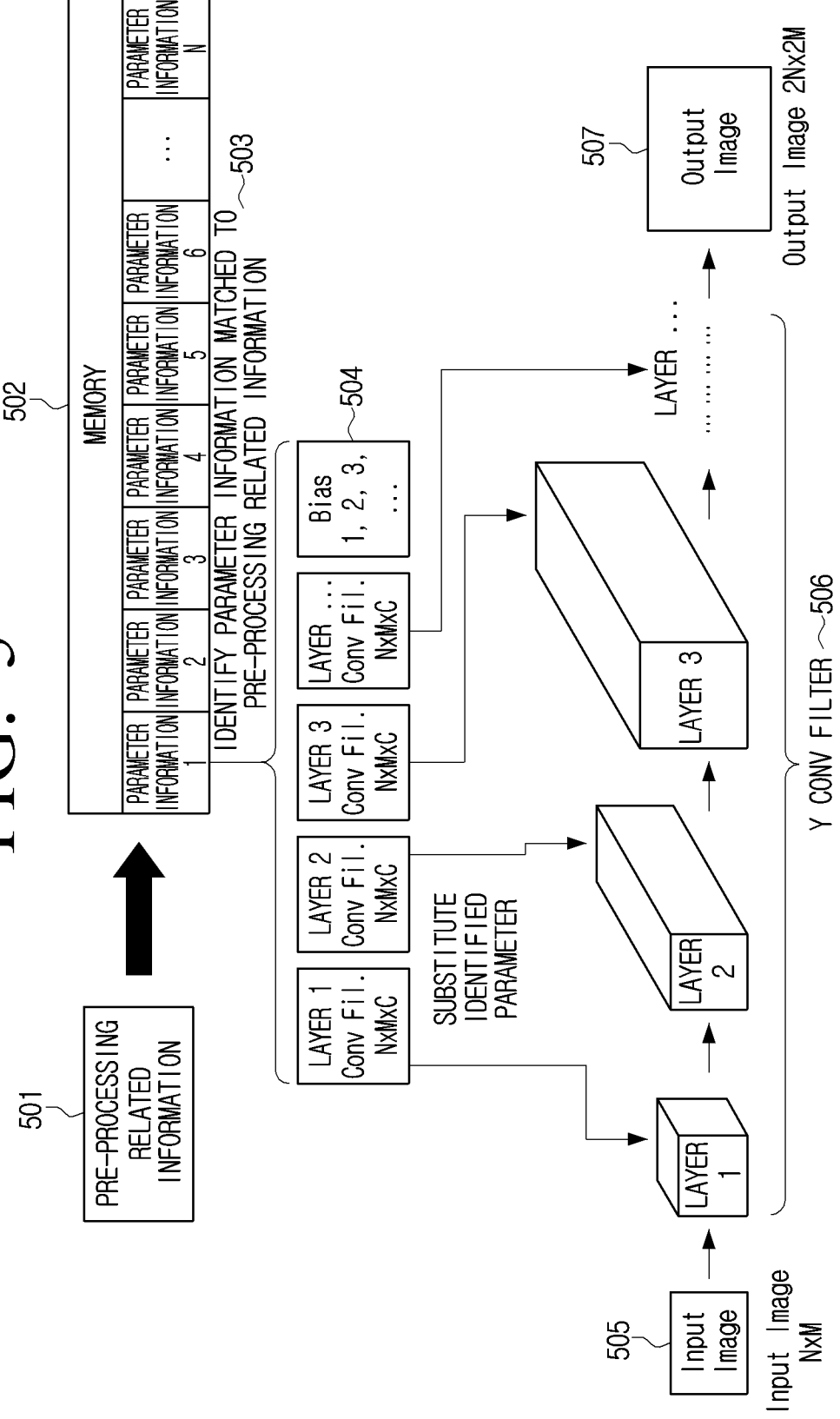
FIG. 5 is a diagram illustrating an example artificial intelligence model according to an embodiment of the disclosure.

FIG. 5 is a diagram illustrating an example artificial intelligence model according to an embodiment of the disclosure.

Referring to FIG. 5, a memory 502 may store parameter information mapped to pre-processing related information 501 corresponding to each of different pre-processings. The parameter information may be information that has been previously trained such that a difference between an original image (e.g., an original image before downscaling) received by the transmitting device 200 and the upscaled image obtained using the first artificial intelligence model 1 is minimized and/or reduced.

According to an embodiment, the pre-processing related information 501 may include filter related information applied to the downscaled image by the transmitting device 200 in the pre-processing process. The filter related information may include at least one of the type or intensity of a filter.

Conventionally, when the receiving device 100 performs upscaling, information on a filter applied to the downscaled image in the pre-processing process of the transmitting device 200 is not considered. Therefore, the upscaled image obtained by the receiving device 100 has a problem that a restoration rate of texture, detail, and the like of the original image lost in the pre-processing process is low.

The receiving device 100 according to an embodiment of the disclosure may set the first artificial intelligence model 1 based on the pre-processing related information including the filter related information and the like applied to the downscaled image in the pre-processing process of the transmitting device 200, and upscale the input image using the set first artificial intelligence model 1.

For example, the processor 120 may identify parameter information matched to the received pre-processing related information 501 among a plurality of parameter information stored in the memory 502. Each of the plurality of parameter information may correspond to different pre-processings. As an example, the parameter information may be trained such that the texture, detail, and the like lost as the transmitting device 200 applies the pre-processing filter to the downscaled image are restored in the upscaled image. As another example, the parameter information may be trained such that the texture, detail, and the like lost as the transmitting device 200 applies the pre-processing filter to the downscaled image are restored in the upscaled image obtained using the first artificial intelligence model 1 and the difference between the original image and the upscaled image is minimized.

The memory 502 according to an embodiment of the disclosure may also store the parameter information mapped to the pre-processing related information 501 corresponding to each of different pre-processings as a lookup table (LUT). The processor 120 may identify parameter information corresponding to the received pre-processing related information 501 through the lookup table (503). However, this is merely an example and the memory 502 is not limited thereto. As an example, the memory 502 may also store the parameter information in a form other than the lookup table.

The parameter information may include information on a parameter (e.g., filter coefficient, bias, etc.) used in each of the plurality of neural network layers included in the artificial intelligence model.

Referring to FIG. 5, the processor 120 may identify first parameter information matched to the pre-processing related information 501 (503). The identified first parameter information may include a parameter 504 (e.g., filter coefficient, bias, etc.) corresponding to each of the plurality of neural network layers included in the first artificial intelligence model 1.

According to an embodiment, the first artificial intelligence model 1 may be implemented, for example, and without limitation, as a convolutional neural network (CNN) model, and the parameter information may include, for example, and without limitation, the number of neural network layers included in the CNN model, the size of a convolution filter (e.g., width×height×channel (N×M×C)), bias, etc.

The processor 120 may set (or model) the first artificial intelligence model 1 by substituting each of the plurality of parameters 504 included in the identified parameter information into a corresponding neural network layer. For example, in FIG. 5, the first artificial intelligence model 1 including y neural network layers 506 (or convolution filters) has been obtained, and the number of neural network layers may vary depending on the identified parameter information. In addition, the processor 120 may upscale an input image 505 (e.g., a decoded image) using the first artificial intelligence model 1. The processor 120 may output an upscaled image 507. Referring to FIG. 5, the processor 120 according to an embodiment of the disclosure may upscale the input image 505 having a size of N×M using the first artificial intelligence model 1 to obtain the output image having a size of 2N×2M (or the upscaled image 507). The size of N×M and the size of 2N×2M are arbitrarily assumed for convenience of description, and the receiving device 100 may upscale an input image having various sizes and resolutions to obtain an output image having a high resolution.

The output image 507 may include the texture, detail, and the like lost in the pre-processing process of the transmitting device 200, and may be an image restored so that a difference with the original image is minimized. The output image 507 may be referred to as an upscaled image, a restored image, or a restored output image.

As illustrated in FIG. 5, the first artificial intelligence model 1 according to an embodiment of the disclosure may include a plurality of neural network layers, and each of the plurality of neural network layers may include a plurality of parameters. The first artificial intelligence model 1 may perform neural network calculation through calculation between a calculation result of a previous layer and the plurality of parameters.

According to an example, after applying the convolution filter in an arbitrary layer, calculation data output through an activation function, for example, rectified linear unit (ReLU) calculation may be output. The calculation data output from the layer is multi-channel data, and for example, 64 feature map (or activation map) data may be output and provided to a next layer. However, according to an example, the feature map data may be stored in a memory (internal buffer or external memory) and then provided to the next layer, but the corresponding configuration is not illustrated in FIG. 5. The parameter may refer, for example, to the weight (or coefficient) of the filter. The first artificial intelligence model 1 may perform calculation using various types of activation functions such as, for example, and without limitation, an identity function, a logistic sigmoid function, a hyperbolic tangent (tan h) function, a ReLU function, a leaky ReLU function, or the like.

The processor 120 may upscale the image on which the image quality processing is performed using, for example, a deep learning super resolution (DLSR) technology. The deep learning super resolution (DLSR) technology may refer, for example, to a technology for increasing the resolution of the input image using a CNN model trained based on a learning DB including a high-resolution original image and a low resolution image. According to an example, the DLSR technology, including generative adversarial networks (GAN), may further maximize and/or improve the effect of generating texture parts in the image while performing DLSR image quality processing. In general, the generative adversarial networks (GAN) operates to produce data similar to real data by competitively learning a generator and a discriminator together in a learning manner in which the generator produces nonexistent data and the discriminator discriminates between real and fake data. When such a GAN is applied to improve image quality, it is possible to naturally create textures that are not in the original image but correspond to similar image characteristics, and thus may improve detail in a texture area. Accordingly, a high quality output image may be obtained.

Figure 6:
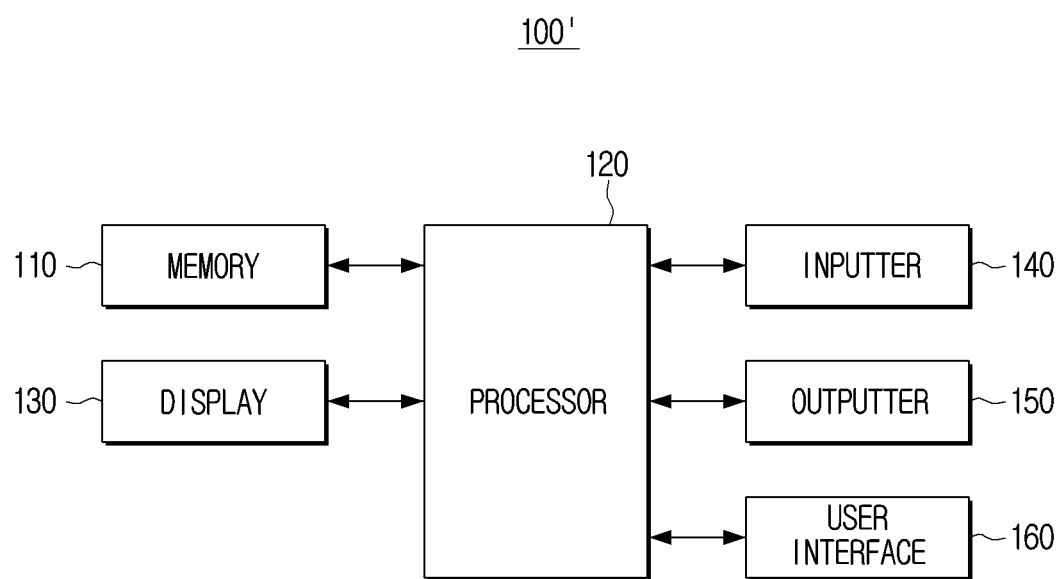
FIG. 6 is a block diagram illustrating an example receiving device according to an embodiment of the disclosure.

FIG. 6 is a block diagram illustrating an example receiving device according to an embodiment of the disclosure.

Referring to FIG. 6, a receiving device 100' includes a memory 110, a processor (e.g., including processing circuitry) 120, a display 130, an inputter (e.g., including input circuitry) 140, an outputter (e.g., including output circuitry) 150, and a user interface (e.g., including user interface circuitry) 160.

The display 130 may be implemented as a display including a self-light emitting element, or a display including a non-light emitting element and a backlight. For example, the display 130 may be implemented as various forms of displays such as, for example, and without limitation, a liquid crystal display (LCD), an organic light emitting diode (OLED) display, a light-emitting diode (LED), a micro LED, a mini LED, a plasma display panel (PDP), a quantum dot (QD) display, a quantum dot light-emitting diodes (QLED), and the like. The display 130 may also include a driving circuit, a backlight unit, and the like which may be implemented in the form of an a-si thin film transistor (TFT), a low temperature poly silicon (LTPS) TFT, and an organic TFT (OTFT). The display 130 may be implemented as a touch screen combined with a touch sensor, a flexible display, a rollable display, a three-dimensional (3D) display, a display in which a plurality of display modules are physically connected to each other, and the like, The processor 120 may include various processing circuitry and control the display 130 to output the output image obtained according to various embodiments described above. The output image may be a high-resolution image of 4K or 8K or more.

The inputter 140 may include various input circuitry and receives various types of contents. For example, the inputter 140 may receive an image signal from an external device (e.g., a source device), an external storage medium (e.g., a USB memory), an external server (e.g., a web hard), or the like in a streaming or download manner through a communication manner such as AP-based Wi-Fi (Wi-Fi, Wireless LAN Network), Bluetooth, Zigbee, Wired/Wireless Local Area Network (WAN), Wide Area Network (WAN), Ethernet, IEEE 1394, High-Definition Multimedia Interface (HDMI), Universal Serial Bus (USB), Mobile High-Definition Link (MHL), Audio Engineering Society/European Broadcasting Union (AES/EBU), Optical, Coaxial, or the like. The image signal may be a digital image signal of any one of a standard definition (SD) image, a high definition (HD) image, a full HD image, and an ultra HD image, but is not limited thereto.

The outputter 150 may include various output circuitry and outputs a sound signal. For example, the outputter 150 may convert a digital sound signal processed by the processor 110 into an analog sound signal, and amplify and output the analog sound signal. For example, the outputter 150 may include at least one speaker unit, a D/A converter, an audio amplifier, and the like that may output at least one channel According to an example, the outputter 150 may be implemented to output various multi-channel sound signals. The processor 120 may control the outputter 150 to perform and output enhancement processing on the input sound signal so as to correspond to the enhancement processing of the input image. For example, the processor 120 may convert an input two-channel sound signal into a virtual multi-channel (e.g., a 5.1 channel) sound signal, or recognize a position where the receiving device 100' is placed and process the recognized position with a stereo sound signal optimized for a space, or provide an optimized sound signal according to the type (e.g., content genre) of the input image.

The user interface 160 include various user interface circuitry and may be implemented as a device such as a button, a touch pad, a mouse, or a keyboard, or may be implemented as a touch screen, a remote controller transceiver, or the like that may also perform the display function described above and a manipulation/input function. The remote controller transceiver may receive a remote controller signal from an external remote controller or transmit the remote controller signal through at least one communication scheme of infrared communication, Bluetooth communication, or Wi-Fi communication.

The receiving device 100' may further include a tuner and a demodulator according to an implementation example. The tuner (not illustrated) may receive a radio frequency (RF) broadcast signal by tuning a channel selected by a user or all previously stored channels among RF broadcast signals received through an antenna. The demodulator (not illustrated) may receive and demodulate a digital IF signal (DIF) converted by the tuner and perform channel decoding. According to an embodiment, the input image received through the tuner may be processed through the demodulator (not illustrated) and then provided to the processor 110 for image processing according to an embodiment of the disclosure.

Figure 7:
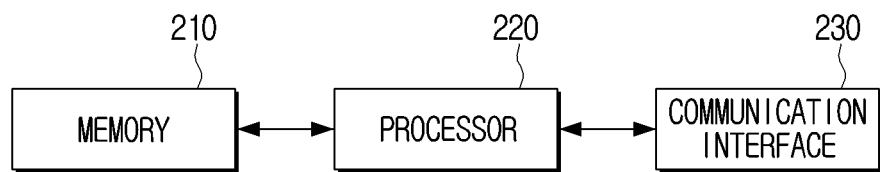
FIG. 7 is a block diagram illustrating an example configuration of an example transmitting device according to an embodiment of the disclosure.

FIG. 7 is a block diagram illustrating an example configuration of an example transmitting device according to an embodiment of the disclosure.

The transmitting device 200 according to an embodiment of the disclosure may include a memory 210, a processor (e.g., including processing circuitry) 220, and a communication interface (e.g., including communication circuitry) 230.

The memory 210 may store data necessary for various embodiments of the disclosure. The memory 210 may be implemented in the form of a memory embedded in the transmitting device 200 or may also be implemented in the form of a memory attachable to and detachable from the transmitting device 200, depending on a data storage purpose. For example, data for driving the transmitting device 200 may be stored in the memory embedded in the transmitting device 200, and data for extended function of the transmitting device 200 may be stored in the memory attachable to and detachable from the transmitting device 200. The memory embedded in the transmitting device 200 may be implemented as at least one of a volatile memory (e.g., a dynamic random access memory (DRAM), a static RAM (SRAM), a synchronous dynamic RAM (SDRAM), or the like), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash, a NOR flash, or the like), a hard drive, or a solid state drive (SSD)). In addition, the memory attachable to and detachable from the transmitting device 200 may be implemented in the form such as a memory card (e.g., a compact flash (CF), a secure digital (SD), a micro secure digital (Micro-SD), a mini secure digital (Mini-SD), an extreme digital (xD), a multi-media card (MMC), or the like), an external memory connectable to a USB port (e.g., a USB memory), or the like.

According to an example, the memory 210 may store a computer program including at least one instruction or instructions for controlling the transmitting device 200.

According to another example, the memory 210 may store information on an artificial intelligence model including a plurality of layers. The storing of the information on the artificial intelligence model may refer, for example, to storing various information related to an operation of the artificial intelligence model, for example, information on the plurality of layers included in the artificial intelligence model, information on parameters (e.g., filter coefficients, bias, and the like) used in each of the plurality of layers, and the like. For example, the memory 210 may store information on the second artificial intelligence model 2 trained to perform the downscaling processing of the image according to an embodiment of the disclosure. However, when the processor 220 is implemented by dedicated hardware, the information on the artificial intelligence model may also be stored in an internal memory of the processor 220.

According to another example, the memory 210 may store an image received from an external device (e.g., a source device), an external storage medium (e.g., USB), an external server (e.g., web hard), or the like. The image may be a digital moving image, but is not limited thereto.

According to another example, the memory 210 may store various information necessary for image quality processing, for example, information for performing at least one of noise reduction, detail enhancement, tone mapping, contrast enhancement, color enhancement, or frame rate conversion, an algorithm, an image quality parameter, and the like. In addition, the memory 210 may also store a final output image generated by the image processing.

According to an embodiment of the disclosure, the memory 210 may be implemented as a single memory that stores data generated in various operations according to the disclosure. However, according to another embodiment of the disclosure, the memory 210 may also be implemented to include a plurality of memories that respectively store different types of data or that respectively store data generated at different stages.

In the above-described embodiments, various data are described as being stored in the external memory 210 of the processor 220, but at least some of the above-described data may also be stored in an internal memory of the processor 220 according to an implementation example of at least one of the transmitting device 200 or the processor 220.

The processor 220 may include various processing circuitry and is electrically connected to the memory 210 to control an overall operation of the transmitting device 200. The processor 220 may be configured as one or a plurality of processors. The processor 220 may perform an operation of the transmitting device 200 according to various embodiments of the disclosure by executing at least one instruction stored in the memory 210.

According to an embodiment, the processor 220 may be implemented, for example, and without limitation, as a digital signal processor (DSP) for processing a digital image signal, a microprocessor, a graphics processing unit (GPU), an artificial intelligence (AI) processor, a neural processing unit (NPU), a time controller (TCON), or the like. However, the processor 220 is not limited thereto, but may include, for example, and without limitation, one or more of a central processing unit (CPU), a dedicated processor, a micro controller unit (MCU), a micro processing unit (MPU), a controller, an application processor (AP), a communication processor (CP), an ARM processor, or the like, or may be defined as the corresponding term. In addition, the processor 220 may be implemented by a system-on-chip (SoC) or a large scale integration (LSI) in which a processing algorithm is embedded, or may be implemented in the form of an application specific integrated circuit (ASIC) and a field programmable gate array (FPGA).

In addition, the processor 220 for executing the artificial intelligence model according to an embodiment of the disclosure may be implemented through a combination of a general purpose processor such as a CPU, an AP, a digital signal processor (DSP), or the like, a graphics dedicated processor such as a GPU, a vision processing unit (VPU), or an artificial intelligence dedicated processor such as a NPU, and software. The processor 220 may control to process the input data according to the predefined operation rule or artificial intelligence model stored in the memory 210. When the processor 220 is a dedicated processor (or an artificial intelligence dedicated processor), the processor 220 may be designed in a hardware architecture specialized for the processing of a specific artificial intelligence model. For example, hardware specialized for the processing of the specific artificial intelligence model may be designed as a hardware chip such as ASIC and FPGA. When the processor 220 is implemented as the dedicated processor, the processor 220 may be implemented to include a memory for implementing an embodiment of the disclosure, or implemented to include a memory processing function for using an external memory.

The processor 220 processes input data to obtain output data. The input data may include at least one of a text, an image, or a user voice. For example, the input data may be input through a communicator capable of communicating with an external device, a user inputter such as a keyboard or a touch pad, a camera, a microphone, or the like. The output data may be in various forms depending on the type of artificial intelligence model. For example, the output data may be an image having an improved resolution, object related information included in the image, a text corresponding to voice, and the like.

According to an example, the processor 220 performs image processing on the input image to obtain the output image. The image may include a still image, a plurality of consecutive still images (or frames), or a video. The image processing may be digital image processing including at least one of image enhancement, image restoration, image transformation, image analysis, image understanding, or image compression. According to an example, when the input image is a compressed image, the processor 220 may decode the compressed image and then perform the image processing. According to an embodiment, the processor 220 may perform the image processing on the input image using the artificial intelligence model. For example, the processor 220 may load and use artificial intelligence model related information stored in the memory 210, for example, an external memory such as DRAM, in order to use the artificial intelligence model.

The processor 220 according to an embodiment of the disclosure may pre-process the downscaled image based on the characteristic information of the image obtained from the second artificial intelligence model 2. A detailed description thereof will be described with reference to FIG. 8.

Figure 8:
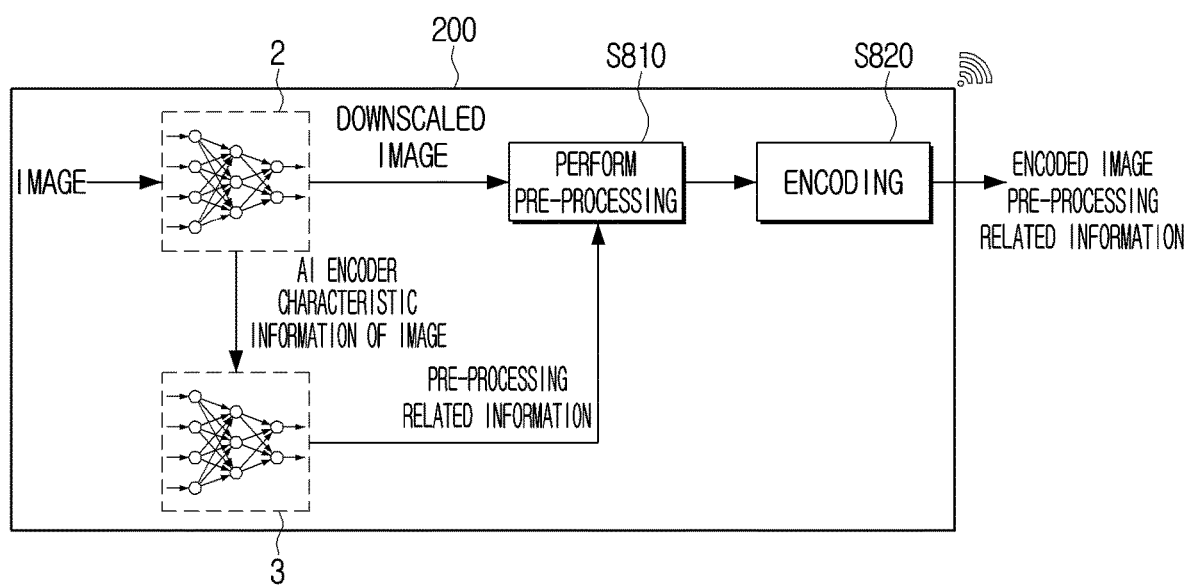
FIG. 8 is a diagram illustrating an example operation of the transmitting device according to an embodiment of the disclosure.

FIG. 8 is a diagram illustrating an example operation of the transmitting device 200 according to an embodiment of the disclosure.

Referring to FIG. 8, the processor 220 may downscale the input image using the second artificial intelligence model 2 learned (e.g., trained) to downscale the image.

According to an embodiment, the processor 220 may downscale an input image having a size of 2N×2M to obtain an output image (or a downscaled image) having a size of N×M. The size of N×M and the size of 2N×2M are arbitrarily assumed for convenience of description, and the transmitting device 100 may downscale an input image having various sizes and resolutions to obtain an output image having a low resolution.

The processor 220 according to an embodiment of the disclosure may obtain filter related information to be applied to the pre-processing process of the downscaled image based on the characteristic information obtained of the image from the second artificial intelligence model 2. The filter related information may include at least one of the type or intensity of a filter to be applied to the downscaled image.

The characteristic information of the image may refer, for example, to a feature map obtained according to a convolution processing result of the second artificial intelligence model 2. As an example, the processor 220 may obtain at least one feature information by applying the input image to the second artificial intelligence model 2. For example, the processor 220 may obtain a plurality of pieces of characteristic information by the plurality of neural network layers (or convolutional layers) included in the second artificial intelligence model 2, and each of the plurality of pieces of characteristic information may represent a characteristic (e.g., a vertical direction characteristic, a horizontal direction characteristic or an edge characteristic) of the input image. The feature information of the image may be referred to as a feature map or the like, but hereinafter, the feature information will be collectively referred to for convenience of description.

The processor 220 may obtain pre-processing filter related information to be performed on the input image or the downscaled image using a third artificial intelligence model 3 learned (e.g., trained) to obtain pre-processing related information of the image corresponding to the characteristic information of the image.

For example, the processor 220 may apply the characteristic information (or feature map) output from any one of the plurality of neural network layers included in the second artificial intelligence model 2 to the third artificial intelligence model 3. The processor 220 may obtain pre-processing related information corresponding to the characteristic information of the input image using the third artificial intelligence model 3 trained to output the pre-processing related information corresponding to the characteristic information of the image. The pre-processing related information may include filter related information to be applied to the downscaled image, and the filter related information may include at least one of the type or intensity of a filter.

According to an example, the third artificial intelligence model 3 may be implemented to share at least one layer with the second artificial intelligence model 2. For example, the third artificial intelligence model 3 may include at least one layer that receives feature map data output from a specific layer of the plurality of layers included in the second artificial intelligence model 2. Accordingly, the third artificial intelligence model 3 may be implemented in a form including at least some layers included in the second artificial intelligence model 2 and at least one additional layer. The additional layer may be learned (e.g., trained) to transform the feature map data (e.g., 2D data) into the pre-processing related information (e.g., 1D data) and output the transformed pre-processing related information.

According to an implementation example, the third artificial intelligence model 3 may be implemented in the form that fixes a parameter of at least one layer shared with the second artificial intelligence model 2 and learns the parameters of the remaining layers which are not shared with the second artificial intelligence model 2. For example, transfer learning may be used in the learning of the third artificial intelligence mode 3. The transfer learning may refer, for example, to a method of performing learning by reusing a model well-learned for a specific application in another application. For example, assuming that there is a model well-learned to classify animals in the input image, when a model with more types of animals is generated, new models may be generated by reusing existing learned models and learning only a classifier part without having to relearn from the beginning. The transfer learning method has an advantage of being able to learn quickly with a small amount of data and is known to be excellent in performance. When a well-trained model already exists and a similar problem to that model needs to be solved, it is efficient to use such a method. As such, the third artificial intelligence model 3 may be implemented in a form that uses at least some layers of the second artificial intelligence model 2 well-learned for downscaling and additionally learns the remaining added layer.

For example, the processor 220 may identify a bilateral filter as the pre-processing filter based on the pre-processing related information obtained using the third artificial intelligence model 3. The processor 220 may identify an intensity of the bilateral filter, for example, a filter weight value based on the pre-processing related information. For example, the filter weight value may be identified using Mathematical expression 1 below.

$$\omega(i, j, k, l) = \exp\left(-\frac{(i-k)^2 + (j-l)^2}{2\sigma_d^2} - \frac{\|I(i, j) - I(k, l)\|^2}{2\sigma_r^2}\right)$$ [Mathematical expression 1]

Here, (i, j) represents a pixel coordinate, I(i, j) represents an intensity of a (I, j) pixel, and I(k, 1) represents an intensity of a (k, 1) pixel in a Kernel size. σd and σr represent smoothing parameters.

The bilateral filter is merely one example of various filter types, but the pre-processing filter is not limited thereto. As another example, the processor 220 may also identify a Gaussian filter or a median filter as the pre-processing filter based on the pre-processing related information. In addition, the processor 220 may perform the pre-processing with different intensities based on the pre-processing related information even when the same filter is identified (S810).

The processor 220 according to an embodiment of the disclosure may transmit the pre-processing related information to the receiving device 100. For example, the processor 220 may transmit the pre-processing filter related information applied to the downscaled image to the receiving device 100.

The pre-processing related information according to an embodiment may further include information on a difference between an image before the pre-processing filter is applied and an image after the pre-processing filter is applied.

According to an embodiment of the disclosure, the transmitting device 200 may transmit the pre-processing related information including the pre-processing filter related information applied to the image, the information on the difference between the image before the filter is applied and the image after the filter is applied, and the like to the receiving device 100. The information on the difference between the image before the filter is applied and the image after the filter is applied may include Min/Max value, Variance, and the like.

Because the receiving device 100 sets the plurality of neural network layers included in the first artificial intelligence model 1 (e.g., an AI decoder) for upscaling the image based on the received pre-processing related information, the upscaled image obtained from the first artificial intelligence model 1 may include detail, and the like of the original image lost according to the application of the pre-processing filter.

The processor 220 according to an embodiment of the disclosure may encode the pre-processed image (S820). The processor 220 may transmit the encoded image and the pre-processing related information to the receiving device 100.

Referring back to FIG. 7, the processor 220 according to an embodiment of the disclosure may include a communication interface 230.

The communication interface 230 may include various communication circuitry and receives various types of contents. In addition, the communication interface 230 may transmit image data including the encoded image and the pre-processing related information to the receiving device 100 in the form of a bit stream according to the control of the processor 220.

For example, the communication interface 230 may receive an image signal from an external device (e.g., a source device), an external storage medium (e.g., a USB memory), an external server (e.g., a web hard), or the like in a streaming or download manner through a communication manner such as AP-based Wi-Fi (Wi-Fi, Wireless LAN Network), Bluetooth, Zigbee, Wired/Wireless Local Area Network (WAN), Wide Area Network (WAN), Ethernet, IEEE 1394, High-Definition Multimedia Interface (HDMI), Universal Serial Bus (USB), Mobile High-Definition Link (MHL), Audio Engineering Society/European Broadcasting Union (AES/EBU), Optical, Coaxial, or the like. Here, the image signal may be a digital image signal of any one of a standard definition (SD) image, a high definition (HD) image, a full HD image, and an ultra HD image, but is not limited thereto.

The processor 220 according to an embodiment of the disclosure may obtain status information of a network to which the communication interface 230 is connected. The processor 220 may pre-process the downscaled image based on the status information of the network and the characteristic information of the image obtained from the second artificial intelligence model 2.

According to an embodiment, the status information of the network may include a bandwidth, an error rate, an intensity of signal, a latency, and the like of the network.

According to an embodiment, the processor 220 may obtain pre-processing related information including the pre-processing filter related information to be applied to the input image or the downscaled image using the third artificial intelligence model 3 trained to obtain the pre-processing related information using the status information of the network and the characteristic information of the image.

The processor 220 according to an embodiment of the disclosure may identify at least one of the type or intensity of the filter by considering the status information of the network other than the characteristic information of the image to appropriately adjust encoding performance and a compression rate according to the status information of the network.

Various embodiments for a second DNN corresponding to the first artificial intelligence model and a first DNN corresponding to the second artificial intelligence model will be described in greater detail below.

Figure 9:
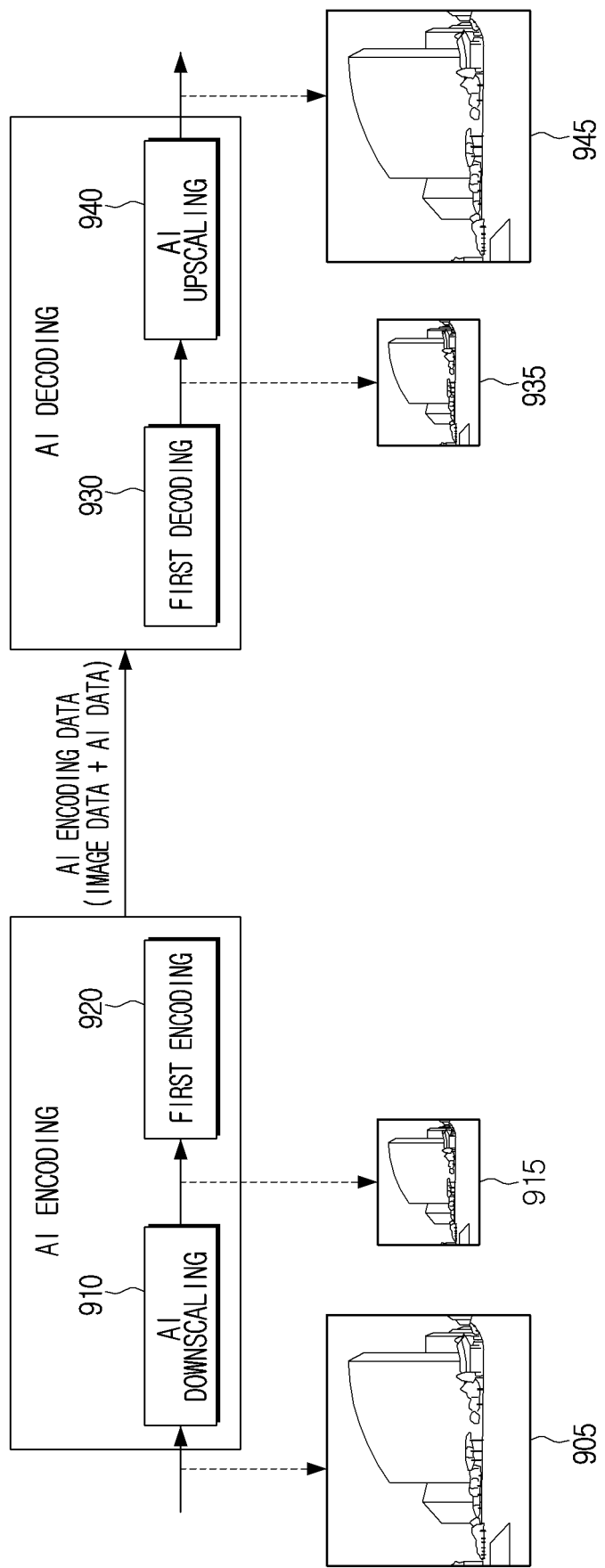
FIG. 9 is a diagram illustrating an example AI encoding process and an AI decoding process according to an embodiment of the disclosure.

FIG. 9 is a diagram illustrating an example artificial intelligence (AI) encoding process and an example AI decoding process according to an embodiment of the disclosure.

As described above, as the resolution of the image increases rapidly, the throughput of information for encoding/decoding increases, and accordingly, the method for improving an encoding and decoding efficiency of the image has been required.

As illustrated in FIG. 9, according to an embodiment of the disclosure, AI downscaling 910 is performed on an original image 905 having high resolution to obtain a first image 915. In addition, because a first encoding 920 and a first decoding 930 are performed on the first image 915 having a relatively small resolution, a processed bitrate may be greatly reduced compared to a case in which the first encoding 920 and the first decoding 930 are performed on the original image 905. The AI downscaling 910 may correspond to the downscaling described above, and the first encoding 920 may correspond to the encoding described above. In addition, the first decoding 930 may correspond to the decoding described above.

Referring to FIG. 9, according to an embodiment, in an AI encoding process, the AI downscaling 910 is performed on the original image 905 to obtain the first image 915, and the first encoding 920 is performed on the first image 915. In an AI decoding process, AI encoding data including AI data obtained as an AI encoding result and image data is received, a second image 935 is obtained through the first decoding 930, and AI upscaling 940 is performed on the second image 935 to obtain a third image 945.

The AI encoding process may be performed in the transmitting device 200, and the AI decoding process may be performed in the receiving device 100.

The AI encoding process will be described in greater detail. When the original image 905 is received, the AI downscaling 910 is performed on the original image 905 obtain the first image 915 having a predetermined resolution or a predetermined image quality. The AI downscaling 910 is performed based on AI, and the AI for the AI downscaling 910 needs to be trained jointly with the AI for the AI upscaling 940 of the second image 935. The reason for this is that when the AI for the AI downscaling 910 and the AI for the AI upscaling 940 are trained separately, the difference between the original image 905, which is the AI encoding target, and the third image 945 restored through the AI decoding, becomes large.

The AI for the AI downscaling 910 may correspond to the second artificial intelligence model 2 described above, and the AI for the AI upscaling 940 may correspond to the first artificial intelligence model described above. In addition, although not illustrated in FIG. 9, all of the AI for the AI downscaling 910, the AI for the AI upscaling 940, and AI for obtaining the pre-processing related information (e.g., the third artificial intelligence model 3) may be trained jointly with each other.

In an embodiment of the disclosure, in order to maintain such a joint relationship in the AI encoding process and the AI decoding process, AI data may be used. Therefore, the AI data obtained through the AI encoding process needs to include information indicating an upscaling target, and in the AI decoding process, the AI upscaling 940 needs to be performed on the second image 935 according to the upscaling target identified based on the AI data.

The AI for the AI downscaling 910 and the AI for the AI upscaling 940 may be implemented, for example, and without limitation, in a deep neural network (DNN). As described below with reference to FIG. 9, because the first DNN and the second DNN are jointly trained through sharing of loss information under a predetermined target, an AI encoding device may provide target information used when the first DNN and the second DNN are jointly trained to an AI decoding device, and the AI decoding device may perform the AI upscaling 940 on the second image 935 at a targeted resolution based on the provided target information.

The first encoding 920 and the first decoding 930 illustrated in FIG. 9 will be described in greater detail. The first image 915 obtained by performing the AI downscaling 910 on the original image 905 may have an amount of information which is reduced through the first encoding 920. The first encoding 920 may include a process of predicting the first image 915 to generate prediction data, a process of generating residual data corresponding to a difference between the first image 915 and the prediction data, a process of transforming the residual data, which may, for example, be a space domain component, into a frequency domain component, a process of quantizing the residual data transformed into the frequency domain component, and a process of entropy-encoding the quantized residual data. Such a first encoding process 920 may be implemented through one of image compression methods using frequency transformation, such as MPEG-2, H.264 Advanced Video Coding (AVC), MPEG-4, High Efficiency Video Coding (HEVC), VC-1, VP8, VP9, AOMedia Video 1 (AV1), and the like.

The second image 935 corresponding to the first image 915 may be restored through the first decoding 930 of the image data. The first decoding 930 may include a process of entropy-decoding image data to generate quantized residual data, a process of dequantizing the quantized residual data, a process of transforming the residual data, which is a frequency domain component, into a space domain component, a process of generating prediction data, and a process of restoring the second image 935 using the prediction data and the residual data. Such a first decoding process 930 may be implemented through an image restoration method corresponding to one of the image compression methods using the frequency transformation, such as MPEG-2, H.264, MPEG-4, HEVC, VC-1, VP8, VP9, AV1, and the like used in the first encoding process 920.

The AI encoding data obtained through the AI encoding process may include the image data obtained as a result of the first encoding 920 of the first image 915 and AI data related to the AI downscaling 910 of the original image 905. The image data may be used in a process of the first decoding 930, and the AI data may be used in a process of the AI upscaling 940.

The image data may be transmitted in the form of a bitstream. The image data may include data obtained based on pixel values in the first image 915, for example, residual data, which is a difference between the first image 915 and the prediction data of the first image 915. In addition, the image data may include information used in the process of the first encoding 920 of the first image 915. For example, the image data may include prediction mode information used to perform the first encoding 920 on the first image 915, motion information, and quantization parameter related information used in the first encoding 920. The image data may be generated according to a rule of an image compression method used in the process of the first encoding 920 among the image compression methods using the frequency transformation such as MPEG-2, H.264 AVC, MPEG-4, HEVC, VC-1, VP8, VP9, and AV1, for example, syntax.

The AI data may be used for the AI upscaling 940 based on the second DNN. As described above, because the first DNN and the second DNN are jointly trained, the AI data includes information that allows accurate AI upscaling 940 of the second image 935 through the second DNN to be performed. In the AI decoding process, the AI upscaling 940 may be performed on the second image 935 at a targeted resolution and/or image quality based on the AI data.

The AI data may be transmitted together with the image data in the form of a bitstream. According to an implementation example, the AI data may be transmitted separately from the image data in the form of a frame or a packet. The image data obtained as the result of the AI encoding and the AI data may be transmitted through the same network or different networks.

Figure 10:
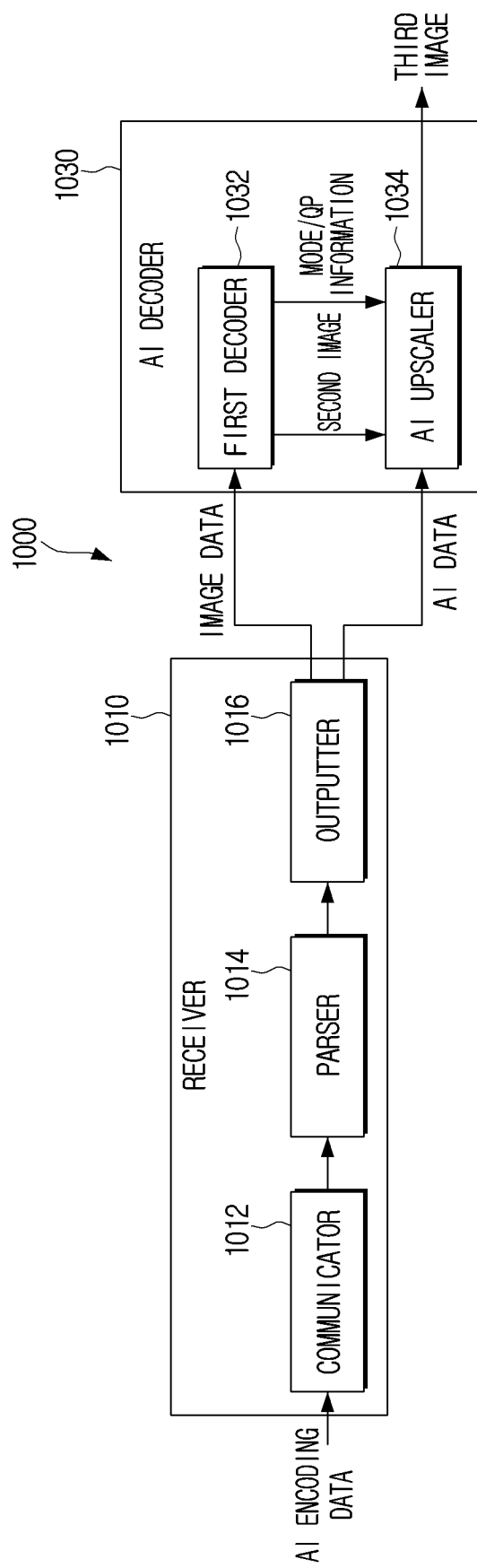
FIG. 10 is a block diagram illustrating an example configuration of an AI decoding device according to an embodiment of the disclosure.

FIG. 10 is a block diagram illustrating an example configuration of an AI decoding device 1000 according to an embodiment of the disclosure.

Referring to FIG. 10, an AI decoding device 1000 according to an embodiment may include a receiver (e.g., including receiving circuitry) 1010 and an AI decoder (e.g., including processing circuitry and/or executable program elements) 1030. The receiver 1010 may include a communicator (e.g., including communication circuitry) 1012, a parser (e.g., including processing circuitry and/or executable program elements) 1014, and an outputter (e.g., including output circuitry) 1016. The AI decoder 1030 may include a first decoder (e.g., including processing circuitry and/or executable program elements) 1032 and an AI upscaler (e.g., including processing circuitry and/or executable program elements) 1034. The AI decoding device 1000 may refer to the receiving device 100. In addition, the first decoder 1032 may correspond to decoding, and the AI upscaler 1034 may correspond to the first artificial intelligence model 1.

The receiver 1010 receives and parses the AI encoding data obtained as the result of the AI encoding, and classifies the image data and the AI data to output the classified data to the AI decoder 1030.

For example, the communicator 1012 may include various communication circuitry and receives the AI encoding data obtained as the result of the AI encoding through the network. The AI encoding data obtained as the result of the AI encoding includes the image data and the AI data. The image data and the AI data may be received through a homogeneous network or a heterogeneous network.

The parser 1014 may include various processing circuitry and/or executable program elements and receives and parses the AI encoding data received through the communicator 1012 and classifies the AI encoding data into the image data and the AI data. For example, the parser 1014 may read a header of the data obtained from the communicator 1012 and identify whether the data is the image data or the AI data. In an example, the parser 1014 classifies the image data and the AI data through the header of the data received through the communicator 1012 and transmits the classified data to the outputter 1016, and the outputter 1016 includes various output circuitry and transmits each classified data to the first decoder 1032 and the AI upscaler 1034. It may also be identified that the image data included in the AI encoding data is image data obtained through a predetermined codec (e.g., MPEG-2, H.264, MPEG-4, HEVC, VC-1, VP8, VP9, or AV1). In this case, the parser 1014 may transmit the corresponding information to the first decoder 1032 through the outputter 1016 so that the image data may be processed by the identified codec.

In an embodiment, the AI encoding data parsed by the parser 1014 may also be obtained from a data storage medium including a magnetic medium such as a hard disk, a floppy disk, or a magnetic tape, an optical recording medium such as a compact disk read only memory (CD-ROM) or a digital versatile disk (DVD), a magneto-optical medium such as a floptical disk, or the like.

The first decoder 1032 may include various processing circuitry and/or executable program elements and restore the second image 935 corresponding to the first image 915 based on the image data. The second image 935 obtained by the first decoder 1032 is provided to the AI upscaler 1034. According to an implementation example, the first decoding related information such as the prediction mode information, the motion information, the quantization parameter information, and the like included in the image data may be further provided to the AI upscaler 1034.

The AI upscaler 1034 may include various processing circuitry and/or executable program elements for receiving the AI data and performs the AI upscaling on the second image 935 based on the AI data. According to an implementation example, the AI upscaling may be performed by further using the first decoding related information such as the prediction mode information, the quantization parameter information, and the like included in the image data.

The AI decoder 1030 may set a plurality of neural network layers included in the AI upscaler 1034 based on the pre-processing related information. A detailed description thereof has been described above.

The receiver 1010 and the AI decoder 1030 according to an embodiment are described as separate devices, but may be implemented through a single processor. The receiver 1010 and the AI decoder 1030 may be implemented by a dedicated processor, and may also be implemented through a combination of a general purpose processor such as the AP, the CPU, or the GPU and software S/W. In addition, the dedicated processor may be implemented to include a memory for implementing the embodiment of the disclosure, or may be implemented to include a memory processor for using an external memory.

In addition, the receiver 1010 and the AI decoder 1030 may also be configured by a plurality of processors. The receiver 1010 and the AI decoder 1030 may be implemented by a combination of the dedicated processors, and may also be implemented through a combination of a plurality of general purpose processors such as the APs, the CPUs, and the GPUs and software S/W. Similarly, the AI upscaler 1034 and the first decoder 1032 may be implemented by different processors.

The AI data provided to the AI upscaler 1034 includes information that allows the AI upscaling to be performed on the second image 935. In this case, an upscaling target needs to correspond to the downscaling of the first DNN. Therefore, the AI data needs to include information that may identify a downscaling target of the first DNN.

Examples of the information included in the AI data include difference information between the resolution of the original image 905 and the resolution of the first image 915 and information related to the first image 915.

The difference information may be expressed as information on the degree of resolution transformation of the first image 915 compared to the original image 905 (e.g., resolution transformation rate information). In addition, because the resolution of the first image 915 is known through the resolution of the restored second image 935 and the degree of the resolution transformation can be identified through the resolution of the first image 915, the difference information may also be expressed only by the resolution information of the original image 905. The resolution information may be expressed in a screen size of width/length, or may be expressed in a ratio (16:9, 4:3, and the like) and a size of one axis. In addition, if there is predetermined resolution information, the resolution information may be expressed in the form of an index or a flag.

In addition, the information related to the first image 915 may include information on at least one of the bitrate of the image data obtained as the result of the first encoding of the first image 915 and the type of the codec used when the first encoding is performed on the first image 915.

The AI upscaler 1034 may include various processing circuitry and/or executable program elements and determine an upscaling target of the second image 935 based on at least one of the difference information and the information related to the first image 915 included in the AI data. The upscale target may indicate to what extent resolution the upscaling needs to be performed on the second image 935. If the upscaling target is determined, the AI upscaler 1034 performs the AI upscaling on the second image 935 through the second DNN to obtain a third image 945 corresponding to the upscaling target.

Prior to describing how the AI upscaler 1034 performs the AI upscaling on the second image 935 according to the upscaling target, an AI upscaling process through the second DNN will be described with reference to FIGS. 11 and 12.

Figure 11:
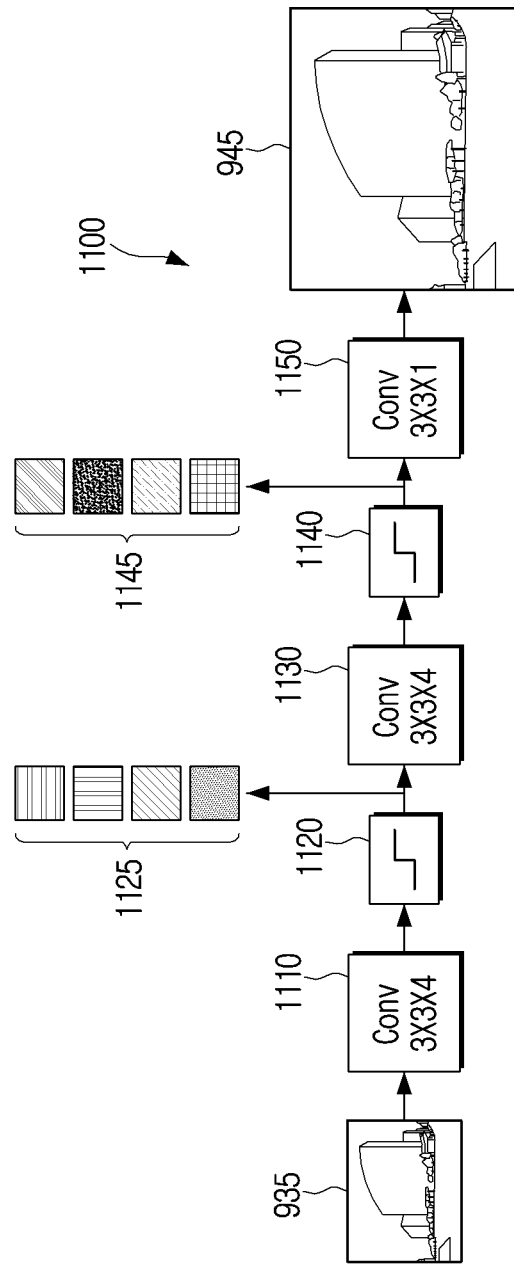
FIG. 11 is a diagram illustrating an example second deep neural network (DNN) for AI upscaling of a second image according to an embodiment of the disclosure.
Figure 12:
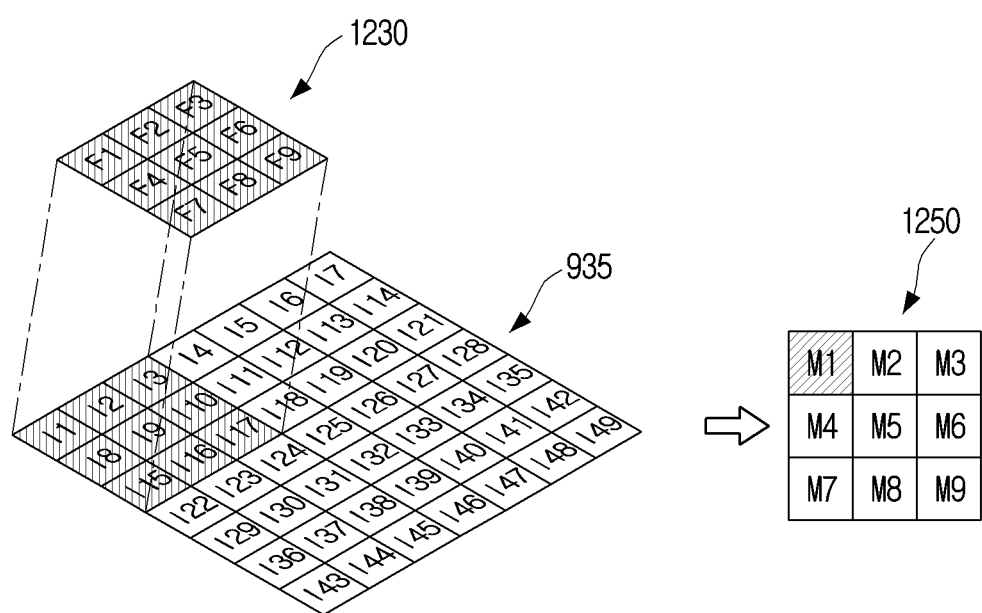
FIG. 12 is a diagram illustrating example convolution calculation by a convolution layer according to an embodiment of the disclosure.

FIG. 11 is diagram illustrating an example second DNN 1100 for AI upscaling of the second image 935 and FIG. 12 is a diagram illustrating example convolution calculation in a first convolution layer 1110 illustrated in FIG. 11 according to an embodiment of the disclosure.

As illustrated in FIG. 11, the second image 935 is input to a first convolution layer 1110. 3×3×4 indicated in the first convolution layer 1110 illustrated in FIG. 11 illustrates convolution processing on one input image using four filter kernels having a size of 3×3. As a result of the convolution processing, four feature maps are generated by the four filter kernels. Each feature map represents unique characteristics of the second image 935. For example, each feature map may represent a vertical direction characteristic, a horizontal direction characteristic or an edge characteristic of the second image 935.

Convolution calculation in the first convolution layer 1110 will be described with reference to FIG. 12.

One feature map 1250 may be generated through multiplication calculation and addition calculation between parameters of the filter kernel 1230 having a size of 3×3 used in the first convolution layer 1110 and the pixel values in the second image 935 corresponding thereto. Because the four filter kernels are used in the first convolution layer 1110, four feature maps may be generated through a convolution calculation process using the four filter kernels.

In FIG. 12, I1 to I49 indicated in the second image 935 represent pixels of the second image 935, and F1 to F9 indicated in the filter kernel 1230 indicate parameters of the filter kernel 1230. In addition, M1 to M9 indicated in a feature map 1250 represent samples of the feature map 1250.

FIG. 12 illustrates that the second image 935 includes 49 pixels, but this is merely an example, and when the second image 935 has a resolution of 4K, the second image 935 may include, for example, 3840×2160 pixels.

In the convolution calculation process, a multiplication calculation between each of pixel values of I1, I2, I3, I8, I9, I10, I15, I16, and I17 of the second image 935 and each of F1, F2, F3, F4, F5, F6, F7, F8, and F9 of the filter kernel 1230 may be performed, and a value obtained by combining (e.g., addition calculation) the result values of the multiplication calculation may be assigned to a value of M1 of the feature map 1250. If a stride of the convolution calculation is 2, a multiplication calculation between each of pixel values of I3, I4, I5, I10, I11, I12, I17, I18, and I19 of the second image 935 and each of F1, F2, F3, F4, F5, F6, F7, F8, and F9 of the filter kernel 1230 may be performed, and a value obtained by combining the result values of the multiplication calculation may be assigned to a value of M2 of the feature map 1250.

The convolution calculation between the pixel values in the second image 935 and the parameters of the filter kernel 1230 may be performed while the filter kernel 1230 moves along the stride until the filter kernel 1230 reaches the last pixel of the second image 935, thereby making it possible to obtain the feature map 1250 having a predetermined size.

According to the disclosure, values of the parameters of the second DNN, for example, the parameters of the filter kernel used in the convolution layers of the second DNN (e.g., F1, F2, F3, F4, F5, F6, F7, F8, and F9 of the filter kernel 1230) may be optimized through the joint training of the first DNN and the second DNN. As described above, the AI upscaler 1034 may determine the upscaling target corresponding to the downscaling target of the first DNN based on the AI data, and determine the parameters corresponding to the determined upscaling target as the parameters of the filter kernel used in the convolution layers of the second DNN.

The convolution layers included in the first DNN and the second DNN may perform the processing according to the convolution calculation process described with reference to FIG. 12, but is not limited thereto, and the convolution calculation process described with reference to FIG. 12 is merely an example.

Referring back to FIG. 11, the feature maps output from the first convolution layer 1110 are input to a first activation layer 1120. The first activation layer 1120 may assign a non-linear characteristic to each feature map. The first activation layer 1120 may include, for example, a sigmoid function, a Tan h function, a rectified linear unit (ReLU) function, and the like, but is not limited thereto.

The assignment of the non-linear characteristic by the first activation layer 1120 may refer, for example, to some sample values of the feature map, which is the output of the first convolution layer 1110, being changed and output. The change may be performed by applying the non-linear characteristic.

The first activation layer 1120 determines whether to transfer sample values of feature maps output from the first convolution layer 1110 to the second convolution layer 1130. For example, some sample values of the feature maps are activated by the first activation layer 1120 and transferred to the second convolution layer 1130, and some sample values thereof are deactivated by the first activation layer 1120 and are not transferred to the second convolution layer 1130. The unique characteristic of the second image 935 represented by the feature maps is highlighted by the first activation layer 1120.

Feature maps 1125 output from the first activation layer 1120 are input to the second convolution layer 1130. One of the feature maps 1125 illustrated in FIG. 11 is a result of the feature map 1250 described with reference to FIG. 12 being processed in the first activation layer 1120.

3×3×4 indicated in the second convolution layer 1130 illustrates convolution processing on the input feature maps 1125 using four filter kernels having a size of 3×3. An output of the second convolution layer 1130 is input to a second activation layer 1140. The second activation layer 1140 may assign a non-linear characteristic to the input data.

Feature maps 1145 output from the second activation layer 1140 are input to a third convolution layer 1150. 3×3×1 indicated in the third convolution layer 1150 illustrated in FIG. 3 illustrates convolution processing for generating one output image using one filter kernel having a size of 3×3. The third convolution layer 1150 is a layer for outputting the final image and generates one output using one filter kernel. According to an example of the disclosure, the third convolution layer 1150 may output the third image 945 through the convolution calculation result.

The DNN setting information indicating the number of filter kernels, the parameters of the filter kernels, and the like of the first convolution layer 1110, the second convolution layer 1130, and the third convolution layer 1150 of the second DNN 1100 may be plural as described below, and a plurality of pieces of DNN setting information need to be jointed with the plurality of pieces of DNN setting information of the first DNN. The joint learning between the plurality of pieces of DNN setting information of the second DNN and the plurality of pieces of DNN setting information of the first DNN may be implemented through joint learning between the first DNN and the second DNN.

FIG. 11 illustrates that the second DNN 1100 includes three convolution layers 1110, 1130, and 1150 and two activation layers 1120 and 1140, but this is merely an example, and according to an implementation example, the number of the convolution layers and the activation layers may be diversely changed. In addition, according to an implementation example, the second DNN 1100 may also be implemented through a recurrent neural network (RNN). Such a case refers to changing a CNN architecture of the second DNN 1100 according to the example of the disclosure to a RNN architecture.

In an embodiment, the AI upscaler 1034 may include at least one arithmetic logic unit (ALU) for the convolution calculation and the calculation of the activation layer described above. The ALU may be implemented as a processor. For convolution calculation, the ALU may include a multiplier for performing a multiplication calculation between the sample values of the feature map output from the second image 935 or the previous layer and the sample values of the filter kernel, and an adder for adding the result values of the multiplication. In addition, for calculation of the activation layer, the ALU may include a multiplier for multiplying the input sample value by a weight used in a predetermined sigmoid function, a Tan h function, or a ReLU function, and a comparator for comparing the multiplied result with a predetermined value to determine whether to transfer the input sample value to the next layer.

Hereinafter, a method of performing the AI upscaling on the second image 935 by the AI upscaler 1034 according to the upscaling target will be described in greater detail.

In an embodiment, the AI upscaler 1034 may store a plurality of pieces of DNN setting information that may be set in the second DNN.

The DNN setting information may include information on at least one of the number of the convolution layers included in the second DNN, the number of the filter kernels for each convolution layer, or the parameter of each filter kernel. The plurality of pieces of DNN setting information may correspond to various upscaling targets, and the second DNN may operate based the DNN setting information corresponding to a specific upscaling target. According to the DNN setting information, the second DNN may have different architectures. For example, according to one DNN setting information, the second DNN may include three convolution layers, and according to another DNN setting information, the second DNN may include four convolution layers.

In an embodiment, the DNN setting information may also include the parameters of the filter kernels used in the second DNN. While the architecture of the second DNN is not changed, only the parameters of an internal filter kernel may vary according to the DNN setting information.

The AI upscaler 1034 may obtain the DNN setting information for AI upscaling of the second image 935 among the plurality of pieces of DNN setting information. Each of the plurality of pieces of DNN setting information used herein is information for obtaining the third image 945 having a predetermined resolution and/or a predetermined image quality and is trained jointly with the first DNN.

For example, any one of the plurality of pieces of DNN setting information may include a pieces of information for obtaining the third image 945 having a resolution twice larger than that of the second image 935, for example, the third image 945 having 4K (4096*2160), which is twice larger than the second image 935 having 2K (2048*1080), and another DNN setting information may include a pieces of information for obtaining the third image 945 having a resolution four times larger than that of the second image 935, for example, the third image 945 having 8K (8192*4320) four times larger than the second image 935 having 2K (2048*1080).

Each of the plurality of pieces of DNN setting information is generated jointly with the DNN setting information of the first DNN of the AI encoding device 1500, and the AI upscaler 1034 obtains one of the plurality of pieces of DNN setting information according an expansion ratio corresponding to a reduction ratio of the DNN setting information of the first DNN. To this end, the AI upscaler 1034 needs to check information of the first DNN. In order for the AI upscaler 1034 to check the information of the first DNN, the AI decoding device 1000 according to an embodiment receives AI data including the information of the first DNN from the AI encoding device 1500.

In other words, the AI upscaler 1034 may check information targeted by the DNN setting information of the first DNN used to obtain the first image 915 using the information received from the AI encoding device 1500, and obtain DNN setting information of the second DNN trained jointly with the checked information.

If the DNN setting information for AI upscaling of the second image 935 among the plurality of pieces of DNN setting information is obtained, the input data may be processed based on the second DNN that operates according to the obtained DNN setting information.

For example, if one DNN setting information is obtained, the number of the filter kernels and the parameters of the filter kernels included in each layer are set as values included in the obtained DNN setting information, for each of the first convolution layer 1110, the second convolution layer 1130, and the third convolution layer 1150 of the second DNN 1100 illustrated in FIG. 3.

For example, the parameters of the filter kernel of 3×3 used in one convolution layer of the second DNN illustrated in FIG. 12 may be set to {1, 1, 1, 1, 1, 1, 1, 1, 1}, and subsequently, if the DNN setting information is changed, the set parameters may be replaced with {2, 2, 2, 2, 2, 2, 2, 2, 2}, which are parameters included in the changed DNN setting information.

The AI upscaler 1034 may obtain the DNN setting information for AI upscaling of the second image 935 among the plurality of pieces of DNN setting information based on the information included in the AI data. The AI data used to obtain the DNN setting information will be described in detail.

In an embodiment, the AI upscaler 1034 may obtain the DNN setting information for AI upscaling of the second image 935 among the plurality of pieces of DNN setting information based on the difference information included in the AI data. For example, if the resolution of the original image 905 (e.g., 4K (4096*2160)) is checked to be twice larger than that of the first image 915 (e.g., 2K (2048*1080)) based on the difference information, the AI upscaler 1034 may obtain the DNN setting information that may increase the resolution of the second image 935 by two times.

In another embodiment, the AI upscaler 1034 may obtain the DNN setting information for AI upscaling of the second image 935 among the plurality of pieces of DNN setting information based on the information related to the first image 915 included in the AI data. The AI upscaler 1034 may determine a mapping relationship between the image related information and the DNN setting information in advance, and obtain the DNN setting information mapped to the information related to the first image 915.

FIG. 13 is a diagram illustrating an example mapping relationship between a plurality of pieces of image related information and a plurality of pieces DNN setting information according to an embodiment of the disclosure.

Through the embodiment described with reference to FIG. 13, it may be seen that the AI encoding/AI decoding process according to the embodiment of the disclosure does not consider only a change in the resolution. As illustrated in FIG. 5, the DNN setting information may be selected by considering individually or all together the resolutions such as SD, HD, and Full HD, bitrates such as 10 Mbps, 15 Mbps, and 20 Mbps, and codec information such as AV1, H.264, and HEVC. For such a consideration, training considering each element in the AI training process needs to be performed jointly with the encoding and decoding process (see FIG. 17).

Therefore, according to the training content, as illustrated in FIG. 13, when a plurality of pieces of DNN setting information is provided based on the image related information including a codec type, a resolution of an image, and the like, the DNN setting information for AI upscaling of the second image 935 may be obtained based on the information related to the first image 915 received from the AI decoding process.

Because the image related information illustrated on the left side of the table illustrated in FIG. 13 and the DNN setting information on the right side of the table are matched, the AI upscaler 1034 may use the DNN setting information according to the image related information. Although not illustrated in FIG. 13, the AI upscaler 1034 may further include DNN setting information according to the pre-processing related information in addition to the image related information.

As illustrated in FIG. 13, if it is checked from the information related to the first image 915 that the resolution of the first image 915 is SD, the bitrate of the image data obtained as the result of the first encoding of the first image 915 is 10 Mbps, and the first encoding of the first image 915 is performed by the AV1 codec, the AI upscaler 1034 may use A DNN setting information of the plurality of pieces of DNN setting information.

In addition, if it is checked from the information related to the first image 915 that the resolution of the first image 915 is HD, the bitrate of the image data obtained as the result of the first encoding of the first image 915 is 15 Mbps, and the first encoding of the first image 915 is performed by the H.264 codec, the AI upscaler 1034 may use B DNN setting information of the plurality of pieces of DNN setting information.

In addition, if it is checked from the information related to the first image 915 that the resolution of the first image 915 is Full HD, the bitrate of the image data obtained as the result of the first encoding of the first image 915 is 20 Mbps, and the first encoding of the first image 915 is performed by the HEVC codec, the AI upscaler 1034 may use C DNN setting information of the plurality of pieces of DNN setting information, and if it is checked that the resolution of the first image 915 is Full HD, the bitrate of the image data obtained as the result of the first encoding of the first image 915 is 15 Mbps, and the first encoding of the first image 915 is performed by the HEVC codec, the AI upscaler 1034 may use D DNN setting information of the plurality of pieces of DNN setting information. One of the C DNN setting information and the D DNN setting information is selected according to whether the bitrate of the image data obtained as the result of the first encoding of the first image 915 is 20 Mbps or 15 Mbps. When the first encoding of the first image 915 having the same resolution is performed by the same codec, the bitrates of the image data being different from each other means that the image quality of the restored image is different from each other. Therefore, the first DNN and the second DNN may be jointly trained based on a predetermined image quality, and accordingly, the AI upscaler 1034 may obtain the DNN setting information according to the bitrate of the image data indicating the image quality of the second image 935.

In another embodiment, the AI upscaler 1034 may also obtain the DNN setting information for AI upscaling of the second image 935 among the plurality of pieces of DNN setting information by considering the information (prediction mode information, motion information, quantization parameter information, and the like) provided from the first decoder 1032 and the information related to the first image 915 included in the AI data all together. For example, the AI upscaler 1034 may receive the quantization parameter information used in the first encoding process of the first image 915 from the first decoder 1032, check the bitrate of the image data obtained as the result of the encoding of the first image 915 from the AI data, and obtain the DNN setting information corresponding to the quantization parameter information and the bitrate. Even with the same bitrate, there may be a difference in the image quality of the restored image depending on the complexity of the image, and the bitrate is a value representing the entire first image 915 on which the first encoding is performed, and the image quality of each frame may be different even within the first image 915. Therefore, by considering the prediction mode information, the motion information, and/or the quantization parameter that may be obtained for each frame from the first decoder 1032, the DNN setting information that is more suitable for the second image 935 may be obtained compared to using only the AI data.

In addition, according to an implementation example, the AI data may include a mutually promised identifier of the DNN setting information. The identifier of the DNN setting information is an upscaling target corresponding to the downscaling target of the first DNN and is information for distinguishing a pair of DNN setting information trained jointly between the first DNN and the second DNN so that the AI upscaling may be performed on the second image 935. The AI upscaler 1034 may obtain the identifier of the DNN setting information included in the AI data and then perform the AI upscaling on the second image 935 using DNN setting information corresponding to the identifier of the DNN setting information. For example, an identifier indicating each of the plurality of pieces of DNN setting information that may be set in the first DNN and an identifier indicating each of the plurality of pieces of DNN setting information that may be set in the second DNN may be designated in advance. In this case, the same identifier may be designated for a pair of DNN setting information that may be set in each of the first DNN and the second DNN. The AI data may include the identifier of the DNN setting information that is set in the first DNN for downscaling of the original image 905. The AI upscaler 1034 that receives the AI data may perform the AI upscaling on the second image 935 using the DNN setting information indicated by the identifier included in the AI data among the plurality of pieces of DNN setting information.

In addition, according to an implementation example, the AI data may also include the DNN setting information. The AI upscaler 1034 may obtain the DNN setting information included in the AI data and then perform the AI upscaling on the second image 935 using the corresponding DNN setting information.

According to an implementation example, when the information (e.g., the number of the convolution layers, the number of the filter kernels for each convolution layer, the parameter of each filter kernel, and the like) configuring the DNN setting information is stored in the form of a lookup table, the AI upscaler 1034 may obtain the DNN setting information by combining some selected from lookup table values based on the information included in the AI data, and perform the AI upscaling on the second image 935 using the obtained DNN setting information.

According to an implementation example, if the architecture of the DNN corresponding to the upscaling target is determined, the AI upscaler 1034 may also obtain DNN setting information corresponding to the determined architecture of the DNN, for example, the parameters of the filter kernels.

The AI upscaler 1034 may obtain the DNN setting information of the second DNN through the AI data including the information related to the first DNN and perform the AI upscaling the second image 935 through the second DNN set to the obtained DNN setting information, which result in reducing the memory usage and the amount of computation compared to directly analyzing and upscaling the features of the second image 935.

In an embodiment, when the second image 935 includes a plurality of frames, the AI upscaler 1034 may independently obtain the DNN setting information for a predetermine number of frames, or may also obtain common DNN setting information for all frames.

Figure 14:
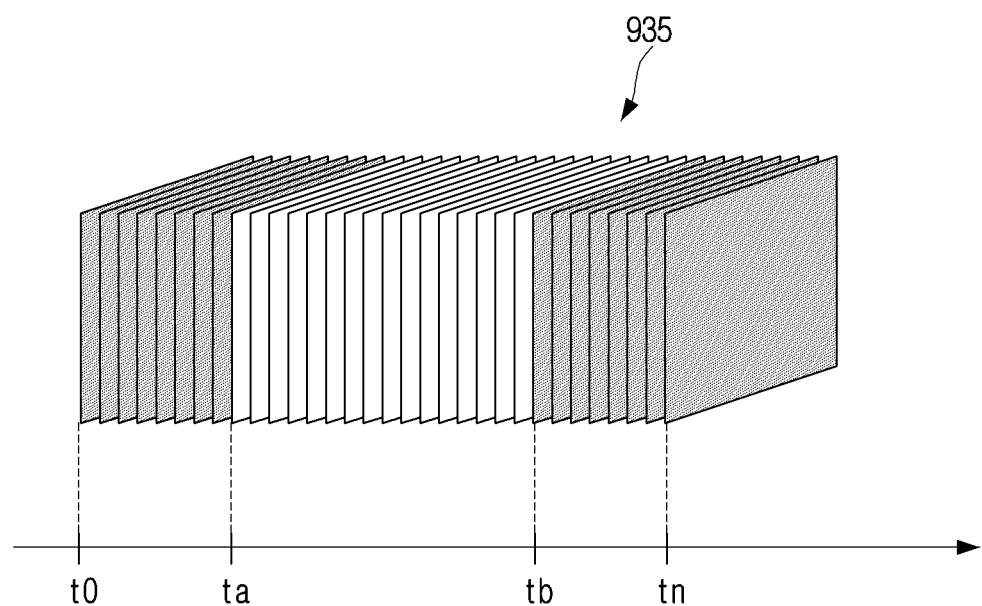
FIG. 14 is a diagram illustrating an example second image including a plurality of frames according to an embodiment of the disclosure.

FIG. 14 is a diagram illustrating an example second image 935 including a plurality of frames according to an embodiment of the disclosure.

As illustrated in FIG. 14, the second image 935 may include frames corresponding to t0 to tn.

In an embodiment, the AI upscaler 1034 may obtain the DNN setting information of the second DNN through the AI data and perform the AI upscaling on the frames corresponding to t0 to tn based on the obtained DNN setting information. For example, the AI upscaling on the frames corresponding to t0 to tn may be performed based on the common DNN setting information.

In another example, the AI upscaler 1034 may perform the AI upscaling on some frames of the frames corresponding to t0 to tn, for example, frames corresponding to t0 to ta with 'A' DNN setting information obtained from the AI data, and perform the AI upscaling on frames corresponding to ta+1 to tb with 'B' DNN setting information obtained from the AI data. In addition, the AI upscaler 1034 may perform the AI upscaling on frames corresponding to tb+1 to tn with 'C' DNN setting information obtained from the AI data. In other words, the AI upscaler 1034 may independently obtain the DNN setting information for each group including a predetermined number of frames among a plurality of frames, and perform the AI upscaling on the frames included in each group with the independently obtained DNN setting information.

In another example, the AI upscaler 1034 may also independently obtain the DNN setting information for each frame included in the second image 935. When the second image 935 includes three frames, the AI upscaler 1034 may perform the AI upscaling on a first frame with DNN setting information obtained with respect to the first frame, perform the AI upscaling on a second frame with DNN setting information obtained with respect to the second frame, and perform the AI upscaling on a third frame with DNN setting information obtained with respect to the third frame. As described above, according to a method in which the DNN setting information is obtained based on the information (prediction mode information, motion information, quantization parameter information, and the like) provided from the first decoder 1032 and the information related to the first image 915 included in the AI data, the DNN setting information may be independently obtained for each frame included in the second image 935. The reason is that the mode information, the quantization parameter information, and the like may be independently determined for each frame included in the second image 935.

In another example, the AI data may include information indicating up to which frame the DNN setting information obtained based on the AI data is valid. For example, if the AI data includes information indicating that the DNN setting information is valid up to ta frames, the AI upscaler 1034 may perform the AI upscaling on t0 to ta frames with the DNN setting information obtained based on the AI data. In addition, if other AI data includes information indicating that the DNN setting information is valid up to tn frames, the AI upscaler 1034 may perform the AI upscaling on ta+1 to tn frames with the DNN setting information obtained based on other AI data.

Hereinafter, an AI encoding device 1500 for AI encoding of the original image 905 will be described with reference to FIG. 15.

Figure 15:
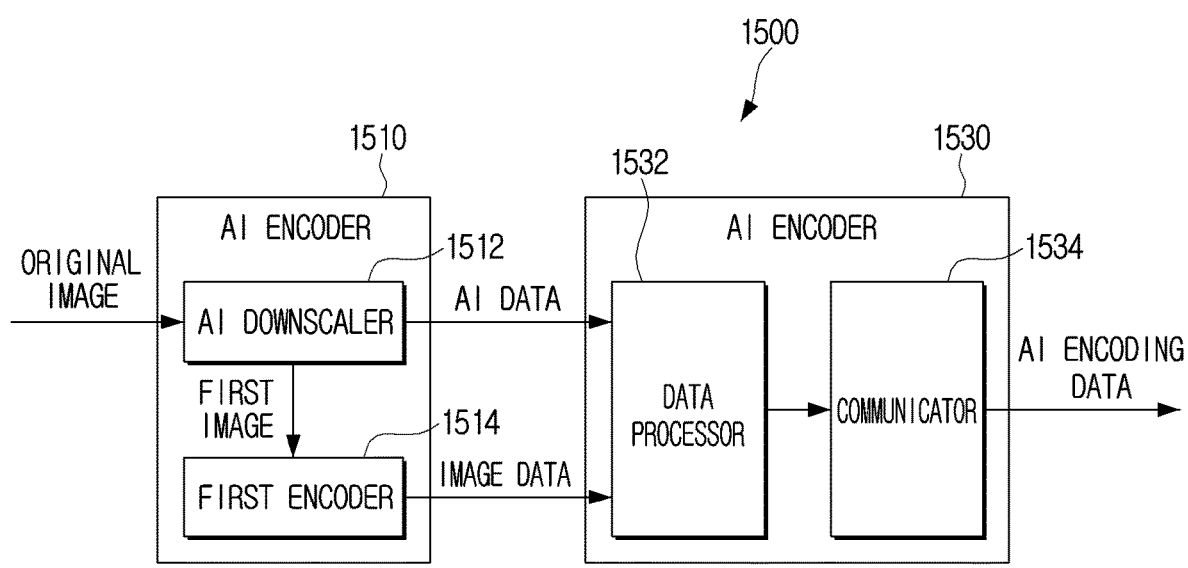
FIG. 15 is a block diagram illustrating an example configuration of an example AI encoding device according to an embodiment of the disclosure.

FIG. 15 is a block diagram illustrating an example configuration of an AI encoding device 1500 according to an embodiment of the disclosure.

Referring to FIG. 15, the AI encoding device 1500 may include an AI encoder (e.g., including processing circuitry and/or executable program elements) 1510 and a transmitter (e.g., including communication circuitry) 1530. The AI encoder 1510 may include an AI downscaler (e.g., including processing circuitry and/or executable program elements) 1512 and a first encoder (e.g., including processing circuitry and/or executable program elements) 1514. The transmitter 1530 may include a data processor (e.g., including processing circuitry) 1532 and a communicator (e.g., including processing circuitry) 1534. The AI encoding device 1500 may refer to the transmitting device 200.

Although FIG. 15 illustrates the AI encoder 1510 and the transmitter 1530 as separate devices, the AI encoder 1510 and the transmitter 1530 may be implemented through one processor. The AI encoder 1510 and the transmitter 1530 may be implemented by a dedicated processor, and may also be implemented through a combination of a general purpose processor such as the AP, the CPU, and the GPU and software S/W. In addition, the dedicated processor may be implemented to include a memory for implementing the embodiment of the disclosure, or may be implemented to include a memory processor for using an external memory.

In addition, the AI encoder 1510 and the transmitter 1530 may also be configured by a plurality of processors. In this case, the AI encoder 1510 and the transmitter 1530 may be implemented by a combination of the dedicated processors, and may also be implemented through a combination of a plurality of general purpose processors such as the APs, the CPUs, and the GPUs and software S/W. The AI downscaler 1512 and the first encoder 1514 may also be implemented by different processors.

The AI encoder 1510 may include various processing circuitry and/or executable program elements and performs an AI downscaling of the original image 905 and a first encoding of the first image 915, and transmits the AI data and the image data to the transmitter 1530. The transmitter 1530 may include various processing circuitry and transmits the AI data and the image data to the AI decoding device 1000.

The image data includes data obtained as a result of the first encoding of the first image 915. The image data may include data obtained based on pixel values in the first image 915, for example, residual data, which is a difference between the first image 915 and the prediction data of the first image 915. In addition, the image data may include information used in the first encoding process of the first image 915. For example, the image data may include prediction mode information and motion information used to perform the first encoding on the first image 915, and quantization parameter related information used to perform the first encoding on the first image 915.

The AI data may include information that allows the AI upscaler 1034 to perform the AI upscaling on the second image 935 to an upscaling target corresponding to the downscaling target of the first DNN. In an example, the AI data may include difference information between the original image 905 and the first image 915. In addition, the AI data may also include information related to the first image 915. The information related to the first image 915 may include information on at least one of the resolution of the first image 915, the bitrate of the image data obtained as the result of the first encoding of the first image 915, and the type of the codec used when the first encoding is performed on the first image 915.

In an embodiment, the AI data may include a mutually promised identifier of the DNN setting information so that the AI upscaling on the second image 935 may be performed to the upscaling target corresponding to the downscaling target of the first DNN.

In addition, in an embodiment, the AI data may also include the DNN setting information that may be set in the second DNN.

The AI downscaler 1512 may include various processing circuitry and/or executable program elements and obtain the first image 915 on which the AI downscaling is performed from the original image 905 through first DNN. The AI downscaler 1512 may determine a downscaling target of the original image 905 based on a predetermined criterion. The AI downscaler 1512 may refer to the second artificial intelligence model 2 (e.g., trained) to downscale the image.

In order to obtain the first image 915 matched to the downscaling target, the AI downscaler 1512 may store a plurality of pieces of DNN setting information that may be set in the first DNN. The AI downscaler 1512 obtains DNN setting information corresponding to the downscaling target among the plurality of pieces of DNN setting information, and performs the AI downscaling on the original image 905 through the first DNN set with the obtained DNN setting information.

Each of the plurality of pieces of DNN setting information may be information trained to obtain the first image 915 having a predetermined resolution and/or a predetermined image quality. For example, any one of the plurality of pieces of DNN setting information may include a pieces of information for obtaining the first image 915 having a resolution ½ times smaller than that of the original image 905, for example, the first image 915 having 2K (2048*1080), which is ½ times smaller than the original image 905 having 4K (4096*2160), and another DNN setting information may include a pieces of information for obtaining the first image 915 having a resolution ¼ times smaller than that of the original image 905, for example, the first image 915 having 2K (2048*1080) ¼ times smaller than the original image 905 having 8K (8192*4320).

According to an implementation example, when the information (e.g., the number of the convolution layers, the number of the filter kernels for each convolution layer, the parameter of each filter kernel, and the like) configuring the DNN setting information is stored in the form of a lookup table, the AI downscaler 1512 may obtain the DNN setting information by combining some selected from lookup table values according to the downscaling target, and perform the AI downscaling on the original image 905 using the obtained DNN setting information.

According to an implementation example, the AI downscaler 1512 may determine the architecture of the DNN corresponding to the upscaling target, and may also obtain DNN setting information corresponding to the determined architecture of the DNN, for example, the parameters of the filter kernels.

The plurality of pieces of DNN setting information for AI downscaling of the original image 905 may have an optimized value by jointly training the first DNN and the second DNN. Here, each DNN setting information may include at least one of the number of the convolution layers included in the first DNN, the number of the filter kernels for each convolution layer, or the parameter of each filter kernel.

The AI downscaler 1512 may set the first DNN with the DNN setting information determined to perform the AI downscaling on the original image 905, and obtain the first image 915 having a predetermined resolution and/or a predetermined image quality through the first DNN. If the DNN setting information for AI downscaling of the original image 905 among the plurality of pieces of DNN setting information is obtained, each layer in the first DNN may process the input data based on the pieces of information included in the DNN setting information.

Hereinafter, a method for the AI downscaler 1512 to determine the downscaling target will be described in greater detail. The downscaling target may indicate, for example, how much reduced resolution of the first image 915 should be obtained from the original image 905.

In an embodiment, the AI downscaler 1512 may determine the downscaling target based on at least one a compression rate (e.g., a resolution difference between the original image 905 and the first image 915, and a target bitrate), a compression quality (e.g., a bitrate type), compression history information, or a type of the original image 905.

In an example, the AI downscaler 1512 may determine the downscaling target based on a compression rate or a compression quality which is predetermined or input from the user.

As another example, the AI downscaler 1512 may also determine the downscaling target using the compression history information stored in the AI encoding device 1500. For example, according to the compression history information that may be used by the AI encoding device 1500, an encoding quality or a compression rate that the user prefers may be determined, and the downscaling target may be determined according to the encoding quality determined based on the compression history information. For example, according to the encoding quality which has been most used according to the compression history information, the resolution, the image quality, and the like of the first image 915 may be determined.

As another example, the AI downscaler 1512 may also determine the downscaling target based on an encoding quality that has been used more than a predetermined threshold (e.g., an average quality of the encoding quality that has been used more than the predetermined threshold) according to the compression history information.

As another example, the AI downscaler 1512 may also determine the downscaling target based on the resolution, type (e.g., file format) of the original image 905.

In an embodiment, when the original image 905 includes a plurality of frames, the AI downscaler 1512 may independently determine the downscaling target for a predetermine number of frames, or may also determine a common downscaling target for all frames.

In an embodiment, the AI downscaler 1512 may divide the frames of the original image 905 into a predetermined number of groups, and independently determine the downscaling target for each group. The downscaling targets that are the same or different from each other may be determined for each group. The number of frames included in the groups may be the same or different for each group.

In another example, the AI downscaler 1512 may independently determine the downscaling target for each frame of the original image 905. The downscaling targets that are the same or different from each other may be determined for each frame.

Hereinafter, an illustrative architecture of a first DNN 1600 that may be the basis of AI downscaling will be described in greater detail.

Figure 16:
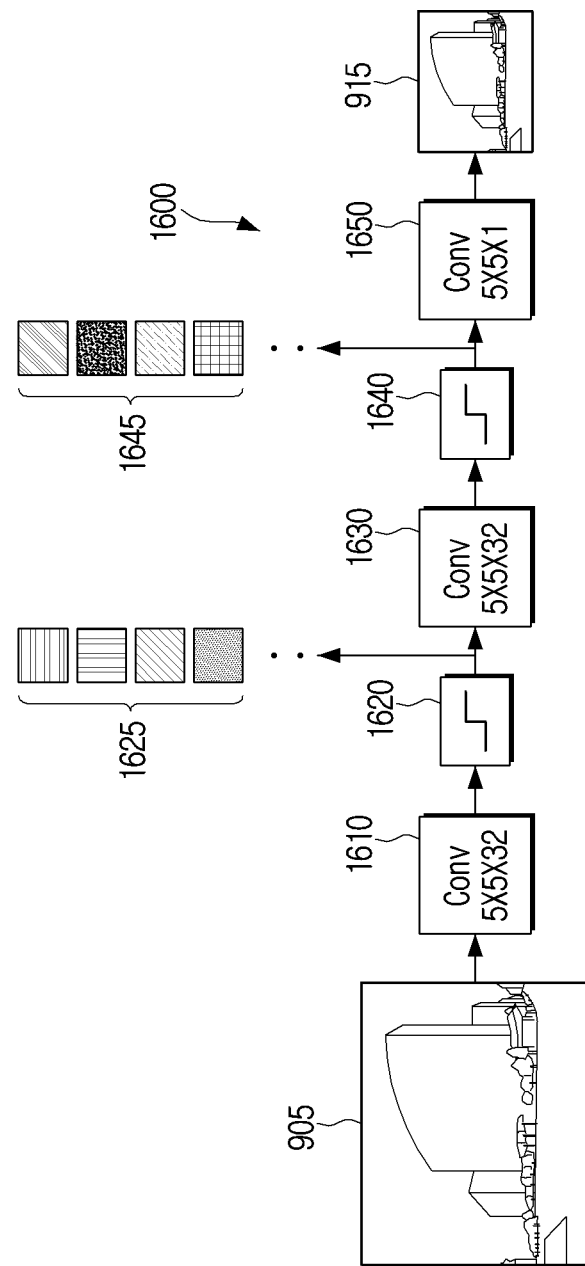
FIG. 16 is a diagram illustrating an example first DNN for AI downscaling of an original image according to an embodiment of the disclosure.

FIG. 16 is a diagram illustrating an example first DNN 1600 for AI downscaling of an original image 905 according to an embodiment of the disclosure.

As illustrated in FIG. 16, the original image 905 is input to a first convolution layer 1610. The first convolution layer 1610 performs convolution processing on the original image 905 using 32 filter kernels having a size of 5×5. 32 feature maps generated as a result of the convolution processing are input to a first activation layer 1620. The first activation layer 1620 may assign a non-linear characteristic to 32 feature maps.

The first activation layer 1620 determines whether to transfer sample values of feature maps output from the first convolution layer 1610 to a second convolution layer 1630. For example, some of sample values of the feature maps are activated by the first activation layer 1620 and transferred to the second convolution layer 1630, and some sample values thereof are deactivated by the first activation layer 1620 and are not transferred to the second convolution layer 1630.

Information represented by feature maps output from the first convolution layer 1610 is highlighted by the first activation layer 1620.

An output 1625 of the first activation layer 1620 is input to the second convolution layer 1630. The second convolution layer 1630 performs convolution processing on the input data using 32 filter kernels having a size of 5×5. 32 feature maps output as a result of the convolution processing are input to a second activation layer 1640, and the second activation layer 1640 may assign non-linear characteristic to the 32 feature maps.

An output 1645 of the second activation layer 1640 is input to a third convolution layer 1650. The third convolution layer 1650 performs convolution processing on the input data using one filter kernel having a size of 5×5. As a result of the convolution processing, one image may be output from the third convolution layer 1650. The third convolution layer 1650 is a layer for outputting the final image and obtains one output using one filter kernel. According to an example of the disclosure, the third convolution layer 1650 may output the first image 915 through the convolution calculation result.

The DNN setting information indicating the number of filter kernels, the parameters of the filter kernels, and the like of the first convolution layer 1610, the second convolution layer 1630, and the third convolution layer 1650 of the first DNN 1600 may be plural, and a plurality of pieces of DNN setting information need to be jointed with the plurality of pieces of DNN setting information of the second DNN. The joint between the plurality of pieces of DNN setting information of the first DNN and the plurality of pieces of DNN setting information of the second DNN may be implemented through joint learning between the first DNN and the second DNN.

FIG. 16 illustrates that the first DNN 1600 includes three convolution layers 1610, 1630, and 1650 and two activation layers 1620 and 1640, but this is merely an example, and according to an implementation example, the number of the convolution layers and the activation layers may be diversely changed. In addition, according to an implementation example, the first DNN 1600 may also be implemented through a recurrent neural network (RNN). Such a case refers to changing a CNN architecture of the first DNN 1600 according to the example of the disclosure to a RNN architecture.

In an embodiment, the AI downscaler 1512 may include at least one ALU for the convolution calculation and the calculation of the activation layer. The ALU may be implemented as a processor. For convolution calculation, the ALU may include a multiplier for performing a multiplication calculation between the sample values of the feature map output from the original image 905 or the previous layer and the sample values of the filter kernel, and an adder for adding the result values of the multiplication. In addition, for calculation of the activation layer, the ALU may include a multiplier for multiplying the input sample value by a weight used in a predetermined sigmoid function, a Tan h function, or a ReLU function, and a comparator for comparing the multiplied result with a predetermined value to determine whether to transfer the input sample value to the next layer.

Referring back to FIG. 15, the first encoder 1514 may include various processing circuitry and/or executable program elements for receiving the first image 915 from the AI downscaler 1512 may perform the first encoding on the first image 915 to reduce an amount of information of the first image 915. As a result of the first encoding by the first encoder 1514, image data corresponding to the first image 915 may be obtained.

The data processor 1532 may include various processing circuitry and processes at least one of AI data and image data to be transmitted in a predetermined form. For example, when the AI data and the image data need to be transmitted in the form of a bitstream, the data processor 1532 processes the AI data so that the AI data is represented in the form of the bitstream, and transmits the AI data and the image data in the form of one bitstream through the communicator 1534. As another example, the data processor 1532 processes the AI data so that the AI data is represented in the form of the bitstream, and transmits each of a bitstream corresponding to the AI data and a bitstream corresponding to the image data through the communicator 1534. As another example, the data processor 1532 processes the AI data so that the AI data is represented in a frame or a packet, and transmits the image data in the form of the bitstream and the AI data in the form of the frame or packet through the communicator 1534. The communicator 1534 may refer to a communication interface 230 provided in the transmitting device 200.

The transmitter 1530 may include various communication circuitry and transmits the AI encoding data obtained as the result of the AI encoding through the network. The AI encoding data obtained as the result of the AI encoding includes the image data and the AI data. The image data and the AI data may be transmitted through a homogeneous network or a heterogeneous network.

In an embodiment, the AI encoding data obtained as the result of the processing by the data processor 1532 may also be stored in a data storage medium including a magnetic medium such as a hard disk, a floppy disk, or a magnetic tape, an optical recording medium such as a compact disk read only memory (CD-ROM) or a digital versatile disk (DVD), a magneto-optical medium such as a floptical disk, or the like.

Although not illustrated in FIGS. 15 and 16, the AI encoding device 1500 according to an embodiment of the disclosure may obtain pre-processing related information to perform pre-processing on the first image 915. For example, the AI encoding device 150 may further include a filter determiner (not illustrated), and the filter determiner may be implemented as an artificial intelligence model. The artificial intelligence model included in the filter determiner may include various processing circuitry and/or executable program elements and may refer to the third artificial intelligence model 3 described above.

The filter determiner may obtain feature map from the first DNN 1600 and identify pre-processing related information corresponding to the feature map. As another example, the filter determiner may identify pre-processing filter related information to be applied to the first image 915 based on the feature map obtained from the first DNN 1600 and status information of the network to which the communicator 1534 is connected. Here, the pre-processing filter related information may include at least one of the type or intensity of a filter.

Hereinafter, a method for jointly training a first DNN 1600 and a second DNN 1100 will be described with reference to FIG. 17.

Figure 17:
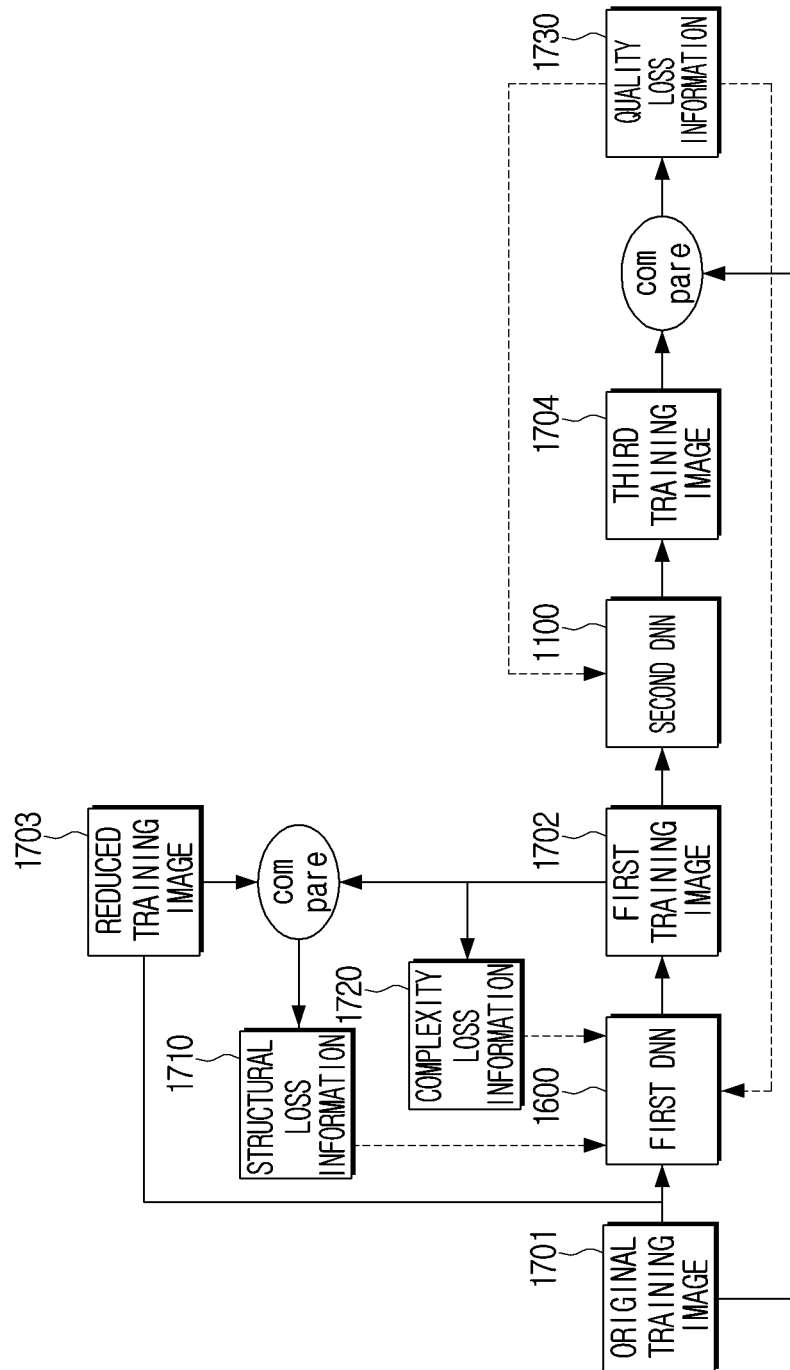
FIG. 17 is a diagram illustrating an example method for training a first DNN and a second DNN according to an embodiment of the disclosure.

FIG. 17 is a diagram illustrating an example method for training a first DNN 1600 and a second DNN 1100 according to an embodiment of the disclosure.

In an embodiment, the original image 905 on which the AI encoding is performed through the AI encoding process is restored to the third image 945 through the AI decoding process, and in order to maintain similarity between the third image 945 obtained as a result of the AI decoding process and the original image 905, an association is required between the AI encoding process and the AI decoding process. The information lost in the AI encoding process needs to be restored in the AI decoding process, and for this purpose, it is required to jointly train the first DNN 1600 and the second DNN 1100.

For accurate AI decoding, it is ultimately necessary to reduce quality loss information 1730 corresponding to a comparison result between a third training image 1704 and an original training image 1701 illustrated in FIG. 17. Therefore, the quality loss information 1730 is used for both training of the first DNN 1600 and the second DNN 1100.

A training process illustrated in FIG. 17 will be described.

In FIG. 17, an original training image 1701 may refer, for example, to an image targeted for AI downscaling, and a first training image 1702 may refer, for example, to an image in which the AI downscaling is performed on the original training image 1701. In addition, a third training image 1704 may refer, for example, to an image in which AI upscaling is performed on the first training image 1702.

The original training image 1701 may include, for example, a still image or a moving image including a plurality of frames. In an embodiment, the original training image 1701 may also include a luminance image extracted from the still image or the moving image including the plurality of frames. In addition, in an embodiment, the original training image 1701 may also include a patch image extracted from the still image or the moving image including the plurality of frames. When the original training image 1701 includes the plurality of frames, the first training image 1702, a second training image, and the third training image 1704 may also include the plurality of frames. When the plurality of frames of the original training image 1701 are sequentially input to the first DNN 1600, a plurality of frames of the first training image 1702, the second training image, and the third training image 1704 may be sequentially obtained through the first DNN 1600 and the second DNN 1100.

For the joint training of the first DNN 1600 and the second DNN 1100, the original training image 1701 is input to the first DNN 1600. The AI downscaling is performed on the original training image 1701 input to the first DNN 1600 to output the first training image 1702, and the first training image 1702 is input to the second DNN 1100. As a result of the AI upscaling on the first training image 1702, the third training image 1704 is output.

Referring to FIG. 17, the first training image 1702 is input to the second DNN 1100. According to an implementation example, the second training image obtained through a first encoding process and a first decoding process of the first training image 1702 may also be input to the second DNN 1100. In order to input the second training image to the second DNN, any one codec of MPEG-2, H.264, MPEG-4, HEVC, VC-1, VP8, VP9, and AV1 may be used. Specifically, any one codec of MPEG-2, H.264, MPEG-4, HEVC, VC-1, VP8, VP9, and AV1 may be used for the first encoding of the first training image 1702 and the first decoding of image data corresponding to the first training image 1702.

Referring to FIG. 17, separately from outputting the first training image 1702 through the first DNN 1600, a reduced training image 1703 legacy downscaled is obtained from the original training image 1701. The legacy downscale may include at least one of a bilinear scale, a bicubic scale, a lanczos scale, or a stair step scale.

In order to prevent and/or reduce a structural feature of the first image 915 from deviating significantly based on a structural feature of the original image 905, the reduced training image 1703 that preserves the structural features of the original training image 1701 is obtained.

Before the training proceeds, the first DNN 1600 and the second DNN 1100 may be set with predetermined DNN setting information. As the training proceeds, structural loss information 1710, complexity loss information 1720, and quality loss information 1730 may be determined.

The structural loss information 1710 may be determined based on a comparison result of the reduced training image 1703 and the first training image 1702. In an example, the structural loss information 1710 may correspond to a difference between structural information of the reduced training image 1703 and structural information of the first training image 1702. The structural information may include various features that may be extracted from the image, such as luminance, contrast, and histogram of the image. The structural loss information 1710 indicates how much structural information of the original training image 1701 is maintained in the first training image 1702. As the structural loss information 1710 is smaller, the structural information of the first training image 1702 becomes similar to the structural information of the original training image 1701.

The complexity loss information 1720 may be determined based on spatial complexity of the first training image 1702. In one example, as the spatial complexity, a total variance value of the first training image 1702 may be used. The complexity loss information 1720 is related to a bitrate of image data obtained by performing the first encoding on the first training image 1702. As the complexity loss information 1720 is smaller, the bitrate of the image data is smaller.

The quality loss information 1730 may be determined based on a comparison result of the original training image 1701 and the third training image 1704. The quality loss information 1730 may include at least one of a L1-norm value, a L2-norm value, a structural similarity (SSIM) value, a peak signal-to-noise ratio-human vision system (PSNR-HVS) value, a multiscale SSIM (MS-SSIM) value, a variance inflation factor (VIF) value, and a video multimethod assessment fusion (VMAF) value for the difference between the original training image 1701 and the third training image 1704. The quality loss information 1730 indicates how similar the third training image 1704 is to the original training image 1701. The smaller the quality loss information 1730, the more similar the third training image 1704 is to the original training image 1701.

Referring to FIG. 17, the structural loss information 1710, the complexity loss information 1720, and the quality loss information 1730 are used for training the first DNN 1600, and the quality loss information 1730 is used for training the second DNN 1100. The quality loss information 1730 is used for both training of the first DNN 1600 and the second DNN 1100.

The first DNN 1600 may update the parameter such that the final loss information determined based on the structural loss information 1710, the complexity loss information 1720, and the quality loss information 1730 is reduced or minimized. In addition, the second DNN 1100 may update the parameter such that the quality loss information 1730 is reduced or minimized.

The final loss information for training the first DNN 1600 and the second DNN 1100 may be determined as illustrated in Mathematics expression 2 below.

$$\text{Loss}DS = a*\text{Structural Loss Information} + b*\text{Complexity Loss Information} + c*\text{Quality Loss Information}$$

$$\text{Loss}US = d*\text{Quality Loss Information} \quad \text{[Mathematical expression 2]}$$

In Mathematical expression 2, LossDS represents final loss information to be reduced or minimized for training of the first DNN 1600, and LossUS represents final loss information to be reduced or minimized for training of the second DNN 1100. In addition, a, b, c, and d may correspond to predetermined weights.

The first DNN 1600 may update the parameters in a direction in which LossDS of Mathematical expression 2 is decreased, and the second DNN 1100 updates the parameters in a direction in which LossUS is reduced. If the parameters of the first DNN 1600 are updated according to the LossDS derived from the training process, the first training image 1702 obtained based on the updated parameter is different from the first training image 1702 in the previous training process, and accordingly, the third training image 1704 is also different from the third training image 1704 of the previous training process. If the third training image 1704 is different from the third training image 1704 of the previous training process, the quality loss information 1730 is also newly determined and accordingly, the second DNN 1100 updates the parameters. If the quality loss information 1730 is newly determined, LossDS is also newly determined, and accordingly, the first DNN 1600 updates the parameters according to the newly determined LossDS. Parameter updating of the first DNN 1600 causes parameter updating of the second DNN 1100, and parameter updating of the second DNN 1100 causes parameter updating of the first DNN 1600. In other words, because the first DNN 1600 and the second DNN 1100 are jointly trained through sharing of the quality loss information 1730, the parameters of the first DNN 1600 and the parameters of the second DNN 1100 may be optimized in association with each other.

Referring to Mathematical expression 2, it may be seen that LossUS is determined according to the quality loss information 1730, but this is one example, and LossUS may also be determined based on at least one of the structural loss information 1710 or the complexity loss information 1720, and the quality loss information 1730.

The AI upscaler 1034 of the AI decoding device 200 and the AI downscaler 612 of the AI encoding device 600 have been described above as storing the plurality of pieces of DNN setting information. A method for training each of the plurality of pieces of DNN setting information stored in the AI upscaler 1034 and the AI downscaler 612 will be described.

As described with reference to Mathematical expression 2, the first DNN 1600 updates the parameters by considering the degree of similarity between the structural information of the first training image 1702 and the structural information of the original training image 1701 (structural loss information 1710), the bitrate (complexity loss information 1720) of the image data obtained as a result of the first encoding of the first training image 1702, and the difference between the third training image 1704 and the original training image 1701 (quality loss information 1730).

For example, the parameters of the first DNN 1600 may be updated so that the first training image 1702 similar to the structural information of the original training image 1701 and having a small bitrate of the image data obtained when the first encoding is performed may be obtained, and the second DNN 1100 performing the AI upscaling on the first training image 1702 may obtain the third training image 1704 similar to the original training image 1701.

By adjusting the weights of a, b, and c in Mathematical expression 2, the direction in which the parameters of the first DNN 1600 are optimized is different. For example, in the case in which the weight of b is determined to be high, the parameter of the first DNN 1600 may be updated with greater importance in lowering the bitrate than the quality of the third training image 1704. In addition, in the case in which the weight of c is determined to be high, the parameter of the first DNN 1600 may be updated with greater importance in increasing the bitrate or increasing the quality of the third training image 1704 rather than maintaining the structural information of the original training image 1701.

In addition, the direction in which the parameters of the first DNN 1600 are optimized may be different according to the type of codec used to perform the first encoding on the first training image 1702. This is because the second training image to be input to the second DNN 1100 may vary according to the type of codec.

The parameters of the first DNN 1600 and the parameters of the second DNN 1100 are jointly updated based on the weight a, the weight b, the weight c, and the type of codec for the first encoding of the first training image 1702. Therefore, if the weight a, the weight b, and the weight c are respectively determined to be predetermined values, the type of codec is determined to be a predetermined kind, and the first DNN 1600 and the second DNN 1100 are then trained, the parameters of the first DNN 1600 and the parameters of the second DNN 1100 that are optimized jointly with each other may be determined.

In addition, if the weight a, the weight b, the weight c, and the type of codec are changed and the first DNN 1600 and the second DNN 1100 are then trained, the parameters of the first DNN 1600 and the parameters of the second DNN 1100 that are optimized jointly with each other may be determined. In other words, if the first DNN 1600 and the second DNN 1100 are trained while changing a value of each of the weight a, the weight b, the weight c, and the type of codec, the plurality of pieces of DNN setting information that are jointly trained may be determined in the first DNN 1600 and the second DNN 1100.

As described above with reference to FIG. 5, the plurality of pieces of DNN setting information of the first DNN 1600 and the second DNN 1100 may be mapped to the first image related information. In order to set such a mapping relationship, the first encoding is performed on the first training image 1702 output from the first DNN 1600 by a specific codec according to a specific bitrate, and the second training image obtained by performing the first decoding on the bitstream obtained as the result of the first encoding may be input to the second DNN 1100. By training the first DNN 1600 and the second DNN 1100 after setting an environment so that the first encoding on the first training image 1702 having a specific resolution is performed at a specific bitrate by a specific codec, a pair of DNN setting information mapped to the resolution of the first training image 1702, the type of codec used for the first encoding of the first training image 1702, and the bitrate of the bitstream obtained as a result of the first encoding of the first training image 1702 may be determined. By variously changing the resolution of the first training image 1702, the type of codec used for the first encoding of the first training image 1702, and the bitrate of the bitstream obtained according to the first encoding of the first training image 1702, the mapping relationship between the plurality of pieces of DNN setting information of the first DNN 1600 and the second DNN 1100 and the first image related information may be determined.

Figure 18:
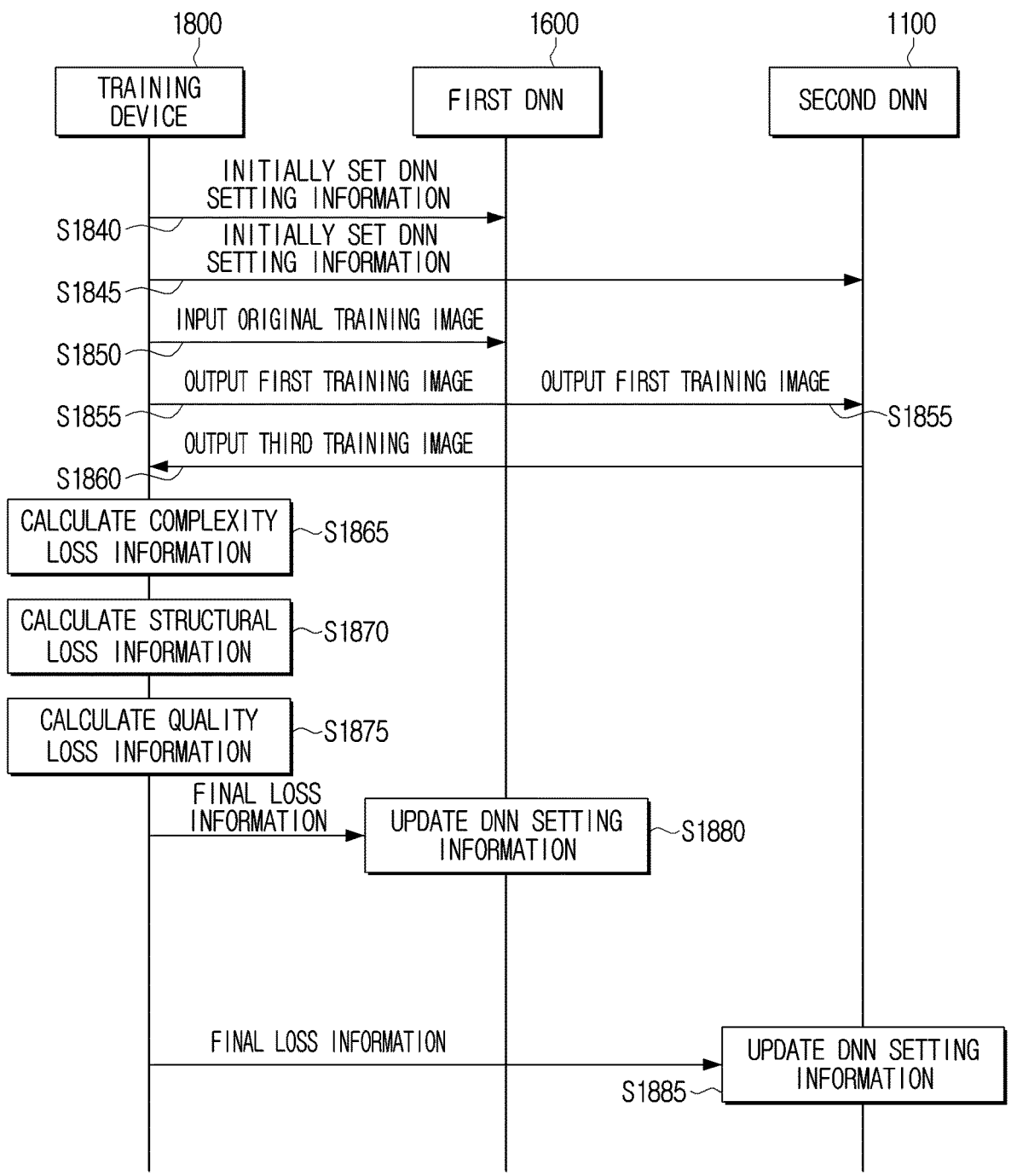
FIG. 18 is a signal flow diagram illustrating an example training process of the first DNN and the second DNN by a training device according to an embodiment of the disclosure.

FIG. 18 is a signal flow diagram illustrating an example training process of the first DNN 1600 and the second DNN 1100 by a training device 1800 according to an embodiment of the disclosure.

The training of the first DNN 1600 and the second DNN 1100 described with reference to FIG. 17 may be performed by the training device 1800. The training device 1800 includes the first DNN 1600 and the second DNN 1100. The training device 1800 may be, for example, the AI encoding device 600 or a separate server. The DNN setting information of the second DNN 1100 obtained as a result of the training is stored in the AI decoding device 1000.

Referring to FIG. 17, the training device 1800 initially sets DNN setting information of the first DNN 1600 and the second DNN 1100 (S1840 and S1845). Thereby, the first DNN 1600 and the second DNN 1100 may operate according to predetermined DNN setting information. The DNN setting information may include information on at least one of the number of the convolution layers included in the first DNN 1600 and the second DNN 1100, the number of the filter kernels for each convolution layer, a size of the filter kernel for each convolution layer, or the parameter of each filter kernel.

The training device 1800 inputs the original training image 1701 to the first DNN 1600 (S1850). The original training image 1701 may include at least one frame of a still image or a moving image.

The first DNN 1600 processes the original training image 1701 according to the initially set DNN setting information, and outputs the first training image 1702 obtained by performing the AI downscaling on the original training image 1701 (S1855). Although FIG. 10 illustrates that the first training image 1702 output from the first DNN 1600 is directly input to the second DNN 1100, the first training image 1702 output from the first DNN 1600 may be input to the second DNN 1100 by the training device 1800. In addition, the training device 1800 may perform the first encoding and the first decoding on the first training image 1702 by a predetermined codec, and then input the second training image to the second DNN 1100.

The second DNN 1100 may process the first training image 1702 or the second training image according to the initially set DNN setting information, and output the third training image 1704 obtained by performing the AI upscaling on the first training image 1702 or the second training image (S1860).

The training device 1800 calculates the complexity loss information 1720 based on the first training image 1702 (S1865).

The training device 1800 calculates the structural loss information 1710 by comparing the reduced training image 1703 and the first training image 1702 (S1870).

The training device 1800 calculates the quality loss information 1730 by comparing the original training image 1701 and the third training image 1704 (S1875).

The first DNN 1600 updates the initially set DNN setting information through a back propagation process based on the final loss information (S1880). The training device 1800 may calculate the final loss information for training the first DNN 1600 based on the complexity loss information 1720, the structural loss information 1710, and the quality loss information 1730.

The second DNN 1100 updates the initially set DNN setting information through a back propagation process based on the quality loss information or the final loss information (S1885). The training device 1800 may calculate the final loss information for training the second DNN 1100 based on the quality loss information 1730.

Thereafter, the training device 1800, the first DNN 1600, and the second DNN 1100 update the DNN setting information while repeating the processes S1850 to S1885 until the final loss information is minimized. In this case, during each repetition process, the first DNN 1600 and the second DNN operate according to the DNN setting information updated in the previous process.

Table 1 below shows the effects of performing the AI encoding and the AI decoding on the original image 905 and encoding and decoding the original image 905 by the HEVC according to an embodiment of the disclosure.

TABLE 1

| Content | Resolution | Number of Frames | Amount of Information (Bitrate) (Mbps) | | Subjective Image Quality Score (VMAF) | |
|---|---|---|---|---|---|---|
| Content_01 | 8K | 300 frames | 46.3 | 21.4 | 94.80 | 93.54 |
| Content_02 | (7680 × 4320) | | 46.3 | 21.6 | 98.05 | 98.98 |
| Content_03 | | | 46.3 | 22.7 | 96.08 | 96.00 |
| Content_04 | | | 46.1 | 22.1 | 83.26 | 92.00 |
| Content_05 | | | 45.4 | 22.7 | 93.42 | 92.98 |
| Content_06 | | | 46.3 | 23.0 | 95.99 | 95.61 |
| | | Average | 46.11 | 22.25 | 94.10 | 94.85 |

As can be seen from Table 1, although a subjective image quality in a case in which the AI encoding and the AI decoding are performed on content having 300 frames of 8K resolution according to an embodiment of the disclosure is higher than that in a case in which the content is encoded and decoded by HEVC, the bitrate is reduced by 50% or more.

Figure 19:
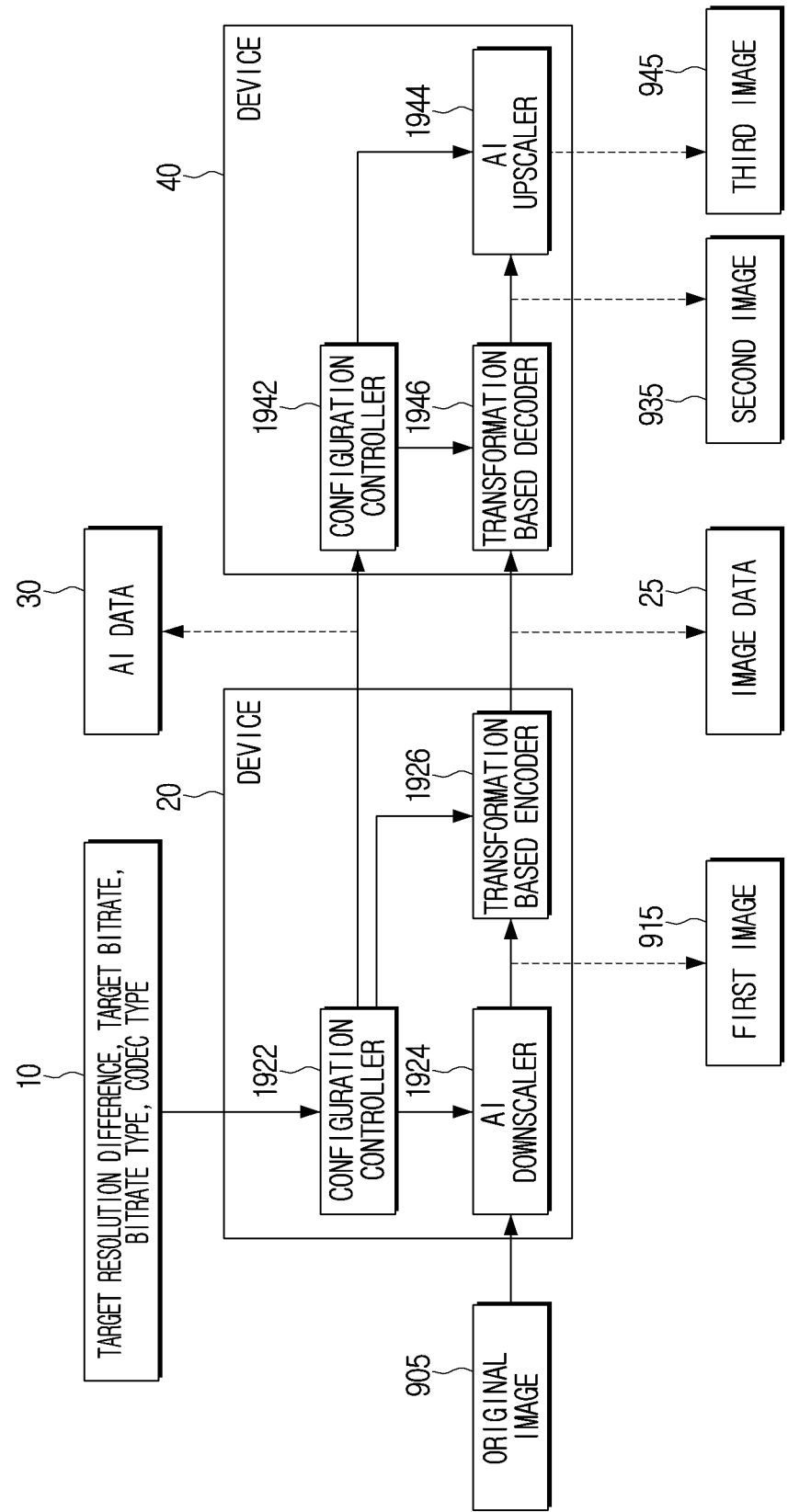
FIG. 19 is a diagram illustrating an example device for AI downscaling of an original image and an example device for AI upscaling of a second image according to an embodiment of the disclosure.

FIG. 19 is a diagram illustrating an example device 20 for AI downscaling of an original image 905 and an example device 40 for AI upscaling of a second image 935. The device 20 for AI downscaling and the device 40 for AI upscaling may refer to the transmitting device 200 and the receiving device 100, respectively.

The device 20 receives the original image 905, and provides image data 25 and AI data 30 to the device 40 using an AI downscaler 1924 and a transformation based encoder 1926. In an embodiment, the image data 25 corresponds to the image data of FIG. 9, and the AI data 30 corresponds to the AI data of FIG. 9. In addition, in an embodiment, the transformation based encoder 1926 corresponds to the first encoder 1514 of FIG. 15, and the AI downscaler 1924 corresponds to the AI downscaler 1512 of FIG. 15.

The device 40 receives the AI data 30 and the image data 25, and obtains a third image 945 using a transformation based decoder 1946 and an AI upscaler 1944. In an embodiment, the transformation based decoder 1946 corresponds to the first decoder 1032 of FIG. 10, and the AI upscaler 1944 corresponds to the AI upscaler 1034 of FIG. 10.

In an embodiment, the device 20 includes a CPU, a memory, and a computer program including instructions. The computer program is stored in the memory. In an embodiment, according to the execution of the computer program by the CPU, the device 20 performs functions to be described with reference to FIG. 19. In an embodiment, the functions to be described with reference to FIG. 19 are performed by a dedicated hardware chip and/or CPU.

In an embodiment, the device 40 includes a CPU, a memory, and a computer program including instructions. The computer program is stored in the memory. In an embodiment, according to the execution of the computer program by the CPU, the device 40 performs functions to be described with reference to FIG. 19. In an embodiment, the functions to be described with reference to FIG. 19 are performed by a dedicated hardware chip and/or CPU.

In FIG. 19, a configuration controller 1922 receives one or more input values 10. In an embodiment, one or more input values 10 may include at least one of a target resolution difference for AI downscaler 1924 and AI upscaler 1944, a bitrate of the image data 25, a bitrate type of the image data 25 (e.g., a variable bitrate type, a constant bitrate type, an average bitrate type), or a codec type for transformation based encoder 1926. The one or more input values 10 may be stored in the device 20 in advance or may include values input from a user.

The configuration controller 1922 controls the operation of the AI downscaler 1924 and the transformation based encoder 1926 based on the received input value 10. In an embodiment, the configuration controller 1922 obtains DNN setting information for the AI downscaler 1924 according to the received input value 10, and sets the AI downscaler 1924 with the obtained DNN setting information. In an embodiment, the configuration controller 1922 may transmit the received input value 10 to the AI downscaler 1924, and the AI downscaler 1924 may obtain DNN setting information for performing the AI downscaling on the original image 905 based on the received input value 10. In an embodiment, the configuration controller 1922 may provide additional information together with the input value 10, for example, information on color formats (such as luminance component, chrominance component, red component, green component, or blue component) to which the AI downscaling is applied, tone mapping information of high dynamic range (HDR), and the like to the AI downscaler 1924, and the AI downscaler 1924 may also obtain the DNN setting information by considering the input value 10 and the additional information. In an embodiment, the configuration controller 1922 transmits at least a portion of the received input value 10 to the transformation based encoder 1926 to allow the transformation based encoder 1926 to perform the first encoding on the first image 915 with a bitrate of a specific value, a bitrate of a specific type, and a specific codec.

The AI downscaler 1924 receives the original image 905 and performs the operations described with respect to at least one of FIGS. 9, 15, 16, 17, and 18 to obtain the first image 915.

In an embodiment, the AI data 30 is provided to the device 40. The AI data 30 may include at least one of the resolution difference information between the original image 905 and the first image 915 or the information related to the first image 915. The resolution difference information may be determined based on a target resolution difference of the input value 10, and the information related to the first image 915 may be determined based on at least one of the target bitrate, the bitrate type, or the codec type. In an embodiment, the AI data 30 may also include parameters used in the AI upscaling process. The AI data may be provided from the AI downscaler 1924 to the device 40.

The first image 915 is processed by the transformation based encoder 1926 to obtain image data 25, and the image data 25 is transmitted to the device 40. The transformation based encoder 1926 may process the first image 915 according to MPEG-2, H.264 AVC, MPEG-4, HEVC, VC-1, VP8, VP9, or AV1.

The configuration controller 1942 controls the operation of the AI upscaler 1944 based on the AI data 30. In an embodiment, the configuration controller 1942 obtains DNN setting information for the AI upscaler 1944 according to the received AI data 30, and sets the AI upscaler 1944 with the obtained DNN setting information. In an embodiment, the configuration controller 1942 may transmit the received AI data 30 to the AI upscaler 1944, and the AI upscaler 1944 may obtain DNN setting information for performing the AI upscaling on the second image 935 based on the AI data 30. In an embodiment, the configuration controller 1942 may provide additional information together with the AI data 30, for example, information on color formats (such as luminance component, chrominance component, red component, green component, or blue component) to which the AI upscaling is applied, tone mapping information of high dynamic range (HDR), and the like to the AI upscaler 1944, and the AI upscaler 1944 may also obtain the DNN setting information by considering the AI data 30 and the additional information. In an embodiment, the AI upscaler 1944 may receive the AI data 30 from the configuration controller 1942, receive at least one of prediction mode information, motion information, or quantization parameter information from the transformation based decoder 1946, and also obtain the DNN setting information based on at least one of the prediction mode information, the motion information, or the quantization parameter information, and the AI data 30.

The transformation based decoder 1946 processes the image data 25 to restore the second image 935. The transformation based decoder 1946 may process the image data 25 according to MPEG-2, H.264 AVC, MPEG-4, HEVC, VC-1, VP8, VP9, or AV1.

The AI upscaler 1944 performs the AI upscaling on the second image 935 provided from the transformation based decoder 1946 based on the set DNN setting information to obtain the third image 945.

The AI downscaler 1924 may include a first DNN, and the AI upscaler 1944 may include a second DNN. In an embodiment, DNN setting information for the first DNN and the second DNN is trained according to the training method described with reference to FIGS. 17 and 18.

The above-described embodiments of the disclosure may be created in a program or instruction executable in a computer, and the created program or instruction may be stored in a medium.

The media may continue to store computer executable programs or instructions or may temporarily store the computer executable programs or instructions for execution or download. In addition, the medium may include various recording means or storage means in the form of a single or several hardware combined, and is not limited to a medium directly connected to any computer system, but may be distributed on a network. Examples of the medium may include a magnetic medium such as a hard disk, a floppy disk, or a magnetic tape; an optical recording medium such as a compact disk read only memory (CD-ROM) or a digital versatile disk (DVD); a magneto-optical medium such as a floptical disk; and a medium configured to store program instructions, including a ROM, a random access memory (RAM), a flash memory, or the like. In addition, other examples of the medium may include a recording medium or a storage medium managed by an app store that distributes an application, a site that supplies or distributes various software, a server, or the like.

A model related the DNN described above may be implemented as a software module. When implemented as a software module (e.g., a program module including instructions), the DNN model may be stored on a computer readable recording medium.

In addition, the DNN model may be integrated in the form of a hardware chip to become part of the above-described AI decoding device 1000 or AI encoding device 600. For example, the DNN model may be manufactured in the form of a dedicated hardware chip for artificial intelligence, or may be manufactured as part of an existing general purpose processor (e.g., CPU or application processor) or graphics dedicated processor (e.g., GPU).

In addition, the DNN model may be provided in the form of downloadable software. The computer program product may include a product (e.g., a downloadable application) in the form of a software program distributed electronically through a manufacturer or an electronic market. For electronic distribution, at least a part of the software program may be stored in a storage medium or temporarily generated. In this case, the storage medium may be a server of the manufacturer or the electronic market, or a storage medium of a relay server.

Figure 20:
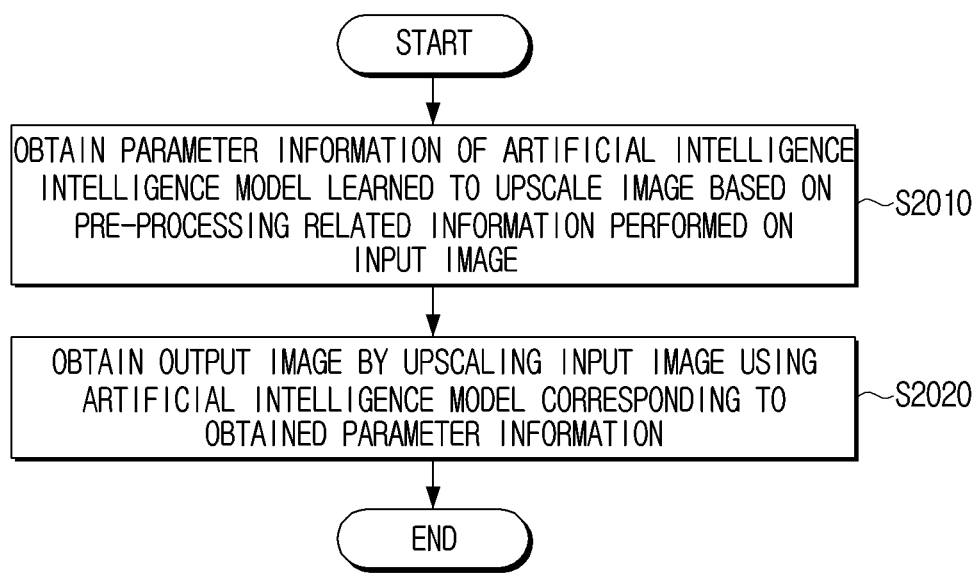
FIG. 20 is a flowchart illustrating an example method of controlling a receiving device according to an embodiment of the disclosure.

FIG. 20 is a flowchart illustrating an example method of controlling a receiving device according to an embodiment of the disclosure.

According to a control method of a receiving device illustrated in FIG. 20, parameter information of an artificial intelligence model that has learned to upscale an image is obtained based on pre-processing related information performed on an input image (S2010).

An output image is obtained by upscaling the input image using an artificial intelligence model corresponding to the obtained parameter information (S2020).

The obtaining (S2010) of the parameter information according to an embodiment of the disclosure may include identifying parameter information corresponding to the pre-processing related information received together with the input image in a memory storing parameter information mapped to the pre-processing related information corresponding to each of different pre-processings, and the obtaining (S2020) of the output image may include upscaling the input image using an artificial intelligence model corresponding to the identified parameter information.

The parameter information stored in the memory includes filter related information applied to each of the different pre-processings, the obtaining (S2010) of the parameter information may include identifying parameter information corresponding to the filter related information received together with the input image among the stored parameter information, and the obtaining (S2020) of the output image may include upscaling the input image using an artificial intelligence model corresponding to the identified parameter information.

The filter related information applied to each of the different pre-processings may include information on at least one of the type or intensity of a filter applied to each of the different pre-processings. The filter related information applied to each of the different pre-processings may further include information on a difference between an image before the filter is applied and an image after the filter is applied.

In addition, the obtaining (S2020) of the output image may include decoding the input image and upscaling the decoded image using the artificial intelligence model.

The artificial intelligence model according to an embodiment of the disclosure may include a plurality of neural network layers, and the control method may include setting a parameter corresponding to each of the plurality of neural network layers based on the obtained parameter information.

However, the various embodiments of the disclosure may be applied to all electronic devices capable of processing the image, such as an image receiving device such as a set-top box and an image processing device, as well as the transmitting device and the receiving device.

The various embodiments described above may be implemented in a computer or similar device readable recording medium using software, hardware, or a combination thereof. In some cases, the embodiments described in the disclosure may be implemented by the processor 120 itself. According to a software implementation, the embodiments such as procedures and functions described in the disclosure may be implemented by separate software modules. Each of the software modules may perform one or more functions and operations described in the disclosure.

Computer instructions for performing processing operations of the receiving device 100 according to the various embodiments of the disclosure described above may be stored in a non-transitory computer-readable medium. The computer instructions stored in the non-transitory computer-readable medium allow a specific device to perform the processing operations of the receiving device 100 according to the various embodiments described above when being executed by a processor of the specific device.

The non-transitory computer-readable medium refers to a medium that stores data semi-permanently and is read by a device. A specific example of the non-transitory computer-readable medium may include a compact disk (CD), a digital versatile disk (DVD), a hard disk, a Blu-ray disk, a universal serial bus (USB), a memory card, a read only memory (ROM), or the like.

Although various example embodiments of the disclosure have been illustrated and described with reference to the drawings, the disclosure is not limited to the various example embodiments, but may be variously modified by those skilled in the art to which the disclosure pertains without departing from the spirit and scope of the disclosure including in the accompanying claims. These modifications should also be understood to fall within the scope and spirit of the disclosure.

What is claimed is:

1. An electronic device comprising:
a memory configured to include at least one instruction;
a communication interface configured to receive, as an input image, from an external electronic device, an encoded downscaled image corresponding to an original image; and
a processor connected to the memory and configured to control the electronic device, and, based on receiving the input image and pre-processing related information related to a pre-processing performed by the external electronic device on the downscaled image after downscaling and prior to encoding, obtain an output image by upscaling the input image using an artificial intelligence model trained to upscale an image,
wherein the processor is configured to:
  decode the input image,
  obtain parameter information based on the pre-processing related information,
  obtain the artificial intelligence model by setting a parameter corresponding to each of a plurality of neural network layers forming the artificial intelligence model based on the obtained parameter information, and
  upscale the decoded image using the artificial intelligence model,
wherein the pre-processing related information received together with the input image includes information related to a filter applied to the downscaled image after downscaling of the original image and prior to encoding and information on a difference between the downscaled image before the filter is applied and the downscaled image after the filter is applied.

2. The electronic device as claimed in claim 1, wherein the memory stores parameter information mapped to the pre-processing related information corresponding to each of different pre-processings, and
  the processor is configured to identify parameter information corresponding to the received pre-processing related information among the stored parameter information, and upscale the input image using the artificial intelligence model based on the identified parameter information.

3. The electronic device as claimed in claim 2, wherein the parameter information stored in the memory includes filter related information applied to each of the different pre-processings, and
  the processor is configured to identify parameter information corresponding to the filter related information based on the received pre-processing related information among the stored parameter information, and upscale the input image using the artificial intelligence model corresponding to the identified parameter information.

4. The electronic device as claimed in claim 3, wherein the filter related information applied to each of the different pre-processings includes information on at least one of a type or an intensity of a filter applied to each of the different pre-processings.

5. A method of controlling an electronic device, the method comprising:
  based on receiving, as an input image, from an external electronic device, an encoded downscaled image corresponding to an original image and pre-processing related information related to a pre-processing performed by the external electronic device on the downscaled image after downscaling of the original image and prior to encoding, decoding the input image;
  obtaining, based on the pre-processing related information, parameter information of an artificial intelligence model trained to upscale an image;
  obtaining the artificial intelligence model by setting a parameter corresponding to each of a plurality of neural network layers forming the artificial intelligence model based on the obtained parameter information;
  obtaining an output image by upscaling the decoded image using the artificial intelligence model,
wherein the pre-processing related information received together with the input image includes information related to a filter applied to the downscaled image after downscaling of the original image and prior to encoding and information on a difference between the downscaled image before the filter is applied and the downscaled image after the filter is applied.

6. The method as claimed in claim 5, further comprising identifying parameter information corresponding to the received pre-processing related information in a memory storing parameter information mapped to pre-processing related information corresponding to each of different pre-processings, and
  upscaling the input image using the artificial intelligence model based on the identified parameter information.

7. The method as claimed in claim 6, wherein the parameter information stored in the memory includes filter related information applied to each of the different pre-processings, and the method further comprises:
  identifying parameter information corresponding to the filter related information based on the received pre-processing related information among the stored parameter information, and
  the obtaining of the output image includes upscaling the input image using the artificial intelligence model corresponding to the identified parameter information.

8. The method as claimed in claim 7, wherein the filter related information applied to each of the different pre-processings includes information on at least one of a type or an intensity of a filter applied to each of the different pre-processings.

9. An electronic device comprising:
  a communication interface;
  a memory configured to store parameter information mapped to pre-processing related information related to each of different pre-processings performed by the external electronic device on a downscaled image after downscaling of an original image; and
  a processor connected to the memory and configured to control the electronic device, and to obtain an output image by upscaling an input image using an artificial intelligence model trained to upscale an image,
wherein the processor is configured to:
  based on receiving, as an input image, from an external electronic device via the communication interface, an encoded downscaled image corresponding to an original image and pre-processing related information related to a pre-processing performed by the external electronic device after downscaling of the original image and prior to encoding, decode the input image;
  identify parameter information corresponding to the received pre-processed related information among the stored parameter information;
  set a parameter of each of a plurality of neural network layers included in the artificial intelligence model based on the identified parameter information; and
  upscale the decoded image using the artificial intelligence model having the set parameter for each neural network layer,
wherein the parameter information stored in the memory includes information on at least one of a type or an intensity of a filter for each of the different pre-processings and information on a difference between the downscaled image before the filter is applied and the downscaled image after the filter is applied.

* * * * *